United States Patent
Colby et al.

(10) Patent No.: US 12,354,158 B2
(45) Date of Patent: *Jul. 8, 2025

(54) ALTERING AN IMAGE OF AN ITEM OR SCENE TO BE MORE ACCURATE OR CONGRUENT

(71) Applicants: Lydia Ann Colby, Eagle, ID (US); Michael K. Colby, Eagle, ID (US)

(72) Inventors: Lydia Ann Colby, Eagle, ID (US); Michael K. Colby, Eagle, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/656,312

(22) Filed: May 6, 2024

(65) Prior Publication Data

US 2024/0289871 A1 Aug. 29, 2024

Related U.S. Application Data

(63) Continuation of application No. 18/348,299, filed on Jul. 6, 2023, now Pat. No. 12,008,636, which is a
(Continued)

(51) Int. Cl.
*G06Q 30/0601* (2023.01)
*G06T 7/80* (2017.01)
(Continued)

(52) U.S. Cl.
CPC ..... *G06Q 30/0643* (2013.01); *G06Q 30/0603* (2013.01); *G06Q 30/0631* (2013.01);
(Continued)

(58) Field of Classification Search
CPC ........... G06Q 30/0643; G06Q 30/0603; G06Q 30/0631; G06T 7/80; G06T 7/90;
(Continued)

(56) References Cited

U.S. PATENT DOCUMENTS 11,727,476 B2 8/2023 Colby et al.
12,008,636 B2 6/2024 Colby et al.
(Continued)

FOREIGN PATENT DOCUMENTS

CN 103577185 2/2014
JP H1196333 4/1999
(Continued)

OTHER PUBLICATIONS

"Extended European Search Report", EP Application No. 21744474.4, Jan. 31, 2024, 8 pages.
(Continued)

*Primary Examiner* — Christopher Wait
(74) *Attorney, Agent, or Firm* — Colby Nipper PLLC

(57) ABSTRACT

This document discloses a method, system, and/or software configured to provide improved color rendering of an item or scene, such as an item for sale through websites or printed brochures (e.g., color catalogs). This improved color rendering can be provided through improved accuracy when rendering an online item, such as on a user's laptop, smartphone, or desktop computer showing a webpage. Further still, this document discloses ways in which to solve numerous problems in the field of online sales where an accurate rendering of an item, and even a customized rendering of an item to fit a buyer's intended use for the item, is desired. This document also describes ways in which to improve color renderings for a print item through use of a user's device to capture an image using the device's camera, and then display the item more accurately or congruently than it was originally displayed in print.

24 Claims, 12 Drawing Sheets
(6 of 12 Drawing Sheet(s) Filed in Color)

Related U.S. Application Data continuation of application No. 17/155,076, filed on Jan. 21, 2021, now Pat. No. 11,727,476.

(60) Provisional application No. 62/964,571, filed on Jan. 22, 2020.

(51) Int. Cl.
    *G06T 7/90* (2017.01)
    *G06T 11/00* (2006.01)
    *G06T 15/00* (2011.01)

(52) U.S. Cl.
    CPC .............. *G06T 7/80* (2017.01); *G06T 7/90* (2017.01); *G06T 11/001* (2013.01); *G06T 15/005* (2013.01); *G06T 2207/10024* (2013.01)

(58) Field of Classification Search
    CPC .............. G06T 11/001; G06T 15/005; G06T 2207/10024; G06T 2200/24; G06T 2210/04; G06T 2219/2012; G06T 19/20
    See application file for complete search history.

(56) References Cited

U.S. PATENT DOCUMENTS

| | | | |
|---|---|---|---|
| 2008/0062442 A1 | 3/2008 | Olson | |
| 2012/0212786 A1 | 8/2012 | Nishiura | |
| 2013/0058543 A1 | 3/2013 | Thomas et al. | |
| 2014/0368530 A1* | 12/2014 | James | G06T 11/001 345/593 |
| 2015/0248775 A1 | 9/2015 | Freeman | |
| 2018/0075524 A1 | 3/2018 | Sartori Odizzio et al. | |
| 2019/0122404 A1 | 4/2019 | Freeman et al. | |
| 2019/0272425 A1 | 9/2019 | Tang et al. | |
| 2021/0224889 A1 | 7/2021 | Colby et al. | |
| 2023/0351490 A1 | 11/2023 | Colby et al. | |

FOREIGN PATENT DOCUMENTS

| | | |
|---|---|---|
| JP | 2002135604 A | 5/2002 |
| JP | 2004015522 | 1/2004 |
| JP | 2006254309 A | 9/2006 |
| JP | 2018106268 A | 7/2018 |
| JP | 2019179432 A | 10/2019 |
| KR | 20180080618 | 7/2018 |
| WO | 2019000409 A1 | 1/2019 |
| WO | 2019133505 A1 | 7/2019 |
| WO | 2021151015 | 7/2021 |

OTHER PUBLICATIONS

"Foreign Office Action", CN Application No. 202180007694.X, Jan. 19, 2024, 19 pages.
"Foreign Office Action", CN Application No. 202180007694.X, Aug. 23, 2023, 4 pages.
"Foreign Office Action", JP Application No. 2022-541824, Sep. 26, 2023, 10 pages.
"International Preliminary Report on Patentability", Application No. PCT/US2021/014784, Jul. 26, 2022, 8 pages.
"International Search Report and Written Opinion", Application No. PCT/US2021/014784, Apr. 16, 2021, 9 pages.
"LCD Screen Tester—Test Digitizer Touch and LCD Screen via Android App", Retrieved at: https://harvestcellular.net/broken-cell-phone-LCD-links/LCD-screen-tester/—on Oct. 27, 2021, 6 pages.
"Lux Meter (Light Meter)—App", Retrieved at: https://play.google.com/store/apps/details?id=com.tsang.alan.lightmeter&hl=en_US—on Oct. 27, 2021, 3 pages.
"Notice of Allowance", U.S. Appl. No. 17/155,076, filed Mar. 29, 2023, 19 pages.
"Notice of Allowance", U.S. Appl. No. 18/348,299, filed Feb. 5, 2024, 9 pages.
"Pantone Studio—App", Retrieved at: https://apps.apple.com/us/app/pantone-studio/id329515634—on Oct. 27, 2021, 4 pages.
Denison, Caleb, "Hands on: Calibrate your TV to perfection with a clever new iPhone app from THX", Retrieved at: https://www.digitaltrends.com/apple/hands-on-with-thx-tune-up-app-easy-tv-calibration-in-the-palm-of-your-hand/, Jan. 29, 2013, 27 pages.
Meyers, et al., "Reusable Hierarchical Command Objects", Apr. 13, 1996, pp. 260-267.
Wycombe, "What Do These Weird Colored Circles on Food Packaging Mean?", Nov. 20, 2015, 3 pages.
"Foreign Office Action", JP Application No. 2024-071446, Mar. 18, 2025, 7 pages.

\* cited by examiner

ALTERING AN IMAGE OF AN ITEM OR SCENE TO BE MORE ACCURATE OR CONGRUENT

CROSS-REFERENCE TO RELATED APPLICATIONS

This application is a continuation application of U.S. Application Ser. No. 18/348,299, filed Jul. 6, 2023, which in turn is a continuation of U.S. Application Ser. No. 17/155,076, filed Jan. 21, 2021, which in turn claims priority to U.S. Provisional Patent Application Ser. No. 62/964,571, filed Jan. 22, 2020, the disclosures of which are incorporated by reference herein in their entirety.

BACKGROUND

Viewing items online, or even through mailed, paper catalogs, suffers from inaccurate renderings of the items.

Consider, for example, an off-white chair for sale in a paper catalog. Should a buyer wish to purchase this chair in the off-white color, he or she may lack confidence that the color matches his or her current off-white décor and then refuse to buy it, costing the seller the profit and the buyer the benefit of ownership. Or, even worse, the buyer may purchase the chair believing that it matches his or her décor, only to discover on delivery that it does not. Then, the buyer or the seller must pay for the shipping to return the item, and both must take the time and effort to handle the return. These are expensive failures caused by inaccurate color renderings of items in catalogs and similar paper renderings.

Inaccurate renderings (e.g., image depictions of an item) are often worse in online sales than those in catalogs. The color renderings are often inaccurate, as they rely on image-capture and image-rendering devices, each of which may introduce color errors. These inaccurate renderings often show shades slightly or drastically different from the actual color of the item. Returns are common on this basis alone, causing innumerable losses in shipping the item both to and from the buyer, irritation of the buyer, and loss of time and money for both the buyer and seller.

SUMMARY

This document discloses a method, system, and/or software configured to provide improved color rendering of an item or scene, such as an item for sale through websites or printed brochures (e.g., color catalogs). This improved color rendering can be provided through improved accuracy when rendering an online item, such as on a user's laptop, smartphone, or desktop computer showing a webpage. Further still, this document discloses ways in which to solve numerous problems in the field of online sales where an accurate rendering of an item, and even a customized rendering of an item to fit a buyer's intended use for the item, is desired. This document also describes ways in which to improve color renderings for a print item through use of a user's device to capture an image using the device's camera, and then display the item more accurately or congruently than it was originally displayed in print.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Aspects of techniques and devices enabling refined search with machine learning are described with reference to the following drawings. The same numbers are used throughout the drawings to reference like features and components.

DETAILED DESCRIPTION

Overview

Figure 1:
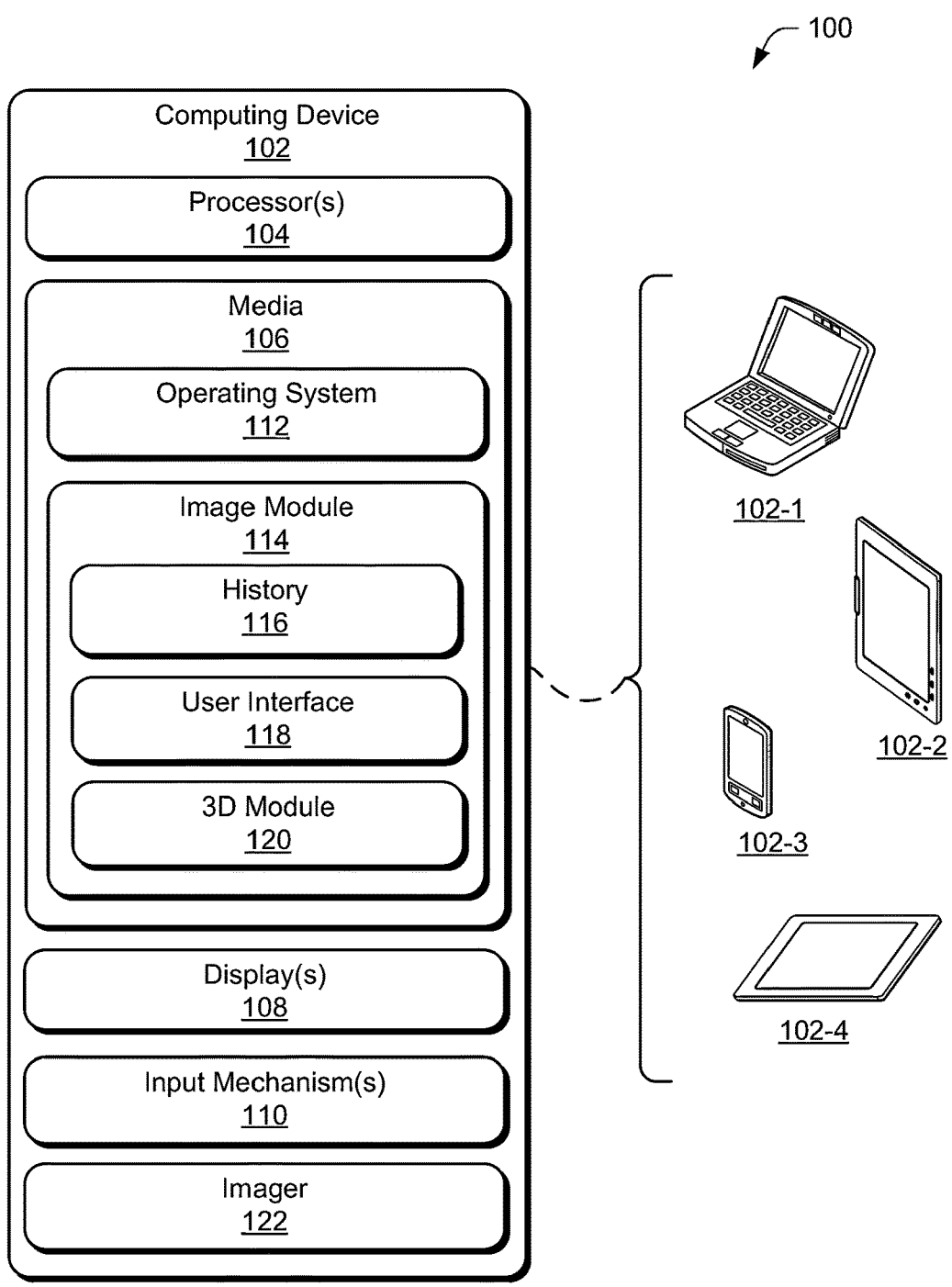
FIG. 1 illustrates an example environment in which techniques for color rendering can be implemented.

This document discloses a method, system, and/or software configured to provide improved color rendering. Examples include photographs, such as family members captured with a camera, items for sale or presentation through websites, or items for sale or presentation in printed brochures, such as color catalogs. The techniques enable improved color rendering through a variety of manners, which improve accuracy when rendering an online item, such as a user's laptop, smartphone, or desktop computer showing a webpage. This document also discloses ways in which to solve numerous problems in the field of online rendering where an accurate depiction of an item or scene is desired. Further still, the disclosed techniques can enable a customized rendering of an item to fit a buyer's intended use for the item. This document also describes ways in which to improve a depiction of an item in a printed image through use of a user's device to capture a picture of the printed image using the device's camera, and then display the item more accurately on the device's display than it was originally displayed in print.

Inaccurate Original Image Capture

An original image capture of an item or scene can be inaccurate. Thus, well before display of the item on a website for sale or even providing the image of the item to be printed, the image captured for the item can be inaccurate. The techniques disclosed here improve the accuracy through use of a physical color standard. This physical color standard provides a check on the color of the captured image. To make use of this physical color standard, an image is captured of the item along with the physical color standard. This can be done with the physical color standard within the image taken of the item, taken contemporaneously, or taken in a same or similar ambient condition. The provider of the image, such as a seller, can use the physical color standard to alter the captured image by comparing the displayed physical color standard with his or her own visual perception of the physical color standard. This can be done by a person, which introduces some possible error but also may correct for errors as well as differences between light that is actually reflected from an object (the actual, measurable physics of the reflected light) and what a human perceives.

The physical color standard is capable of being copied or standardized, and in fact can be the same actual physical color standard as imaged with the item, or it can be captured with the aid of a computer program that stores a rendering and data concerning the physical color standard. In either or both cases, use of the physical color standard can improve the accuracy of the image of the item or scene. The entity capturing the image, such as a seller, can then provide the altered, improved image for the webpage or to a printer. This disclosed technique improves the accuracy of the depiction of the item or scene, which on its own may improve a future rendering of the item as it is eventually rendered to another entity, such as a viewer of the scene or a buyer of the item.

Furthermore, through use of the physical color standard, the techniques can correct an image of an item or scene automatically through use of recorded color information for the physical color standard. These techniques are further described herein.

Inaccurate or Incongruent Rendering

There are numerous ways in which a color image may be inaccurate when it is rendered on paper or a display. As noted, this can start with an inaccurate image capture of the item or scene, but this is far from the only problem.

Consider a case where a seller captures an image with a camera that does not accurately capture the item's color or in ambient light that causes the item to look differently colored than with typical ambient light, such as atypical lights in a home, ambient light from the sun when the image was captured in a fluorescent-lit studio, or captured indoors when the item is likely to be used outdoors.

In these cases, the original image is not congruent to what the item would likely look like in another ambient condition, such as the buyer's intended placement for the item, e.g., outdoors for outdoor furniture, clothing for indoors and outdoors, and indoors for a painting, pillows, carpet, and so forth. As noted, the original image may further be inaccurate on its face, without the error being caused by lighting differences.

To correct this flaw, the techniques disclosed here can provide a physical color standard. This physical color standard provides a check on the color of a rendered image either contemporaneous with the rendering of the image or through prior calibration (described in greater detail below). To make use of this physical color standard, a capturing entity, such as a seller, captures the image of the item along with the physical color standard. As noted, this can be done with the physical color standard within the image taken of the item (though it can also be excised from the image and provided on request in the webpage so as not to clutter the item's spacing until a physical color standard rendering is requested).

In more detail, consider a shirt of a light blue-green color. The shirt's color is likely of importance to a buyer. Thus, rather than guess if the seller took an accurate or congruent image of the shirt, or even guess if the buyer's own display is accurate for the colors being rendered, the seller captures the image of the shirt with the physical color standard. Then, additional opportunities arise for accurate rendering for the buyer. Note that the term accurate reflects an accurate depiction of a color of an item as the image is rendered, relative to how the item looks in real-life at the time of capture. Congruent, however, represents how the item would look in the same locale or another locale different from the locale in which the image was originally captured. Thus, a user may desire accuracy or congruency, and sometimes a blend of both. When buying an item, buyers desire to receive an image of the item in a catalog or website that is accurate. It is also desirable for the image of the item to look as it would in the locale in which the user is looking at the catalog or display. As will be described in detail in this document, a user may wish to see an image of an item or scene altered to make the item look like it is in the user's own ambient lighting, surrounds, lighting angle, and so forth. An accurate color rendering, however, is often desirable even when it is not congruent.

As noted, the seller can use the physical color standard to alter the captured image (as the physical color standard is capable of being copied or standardized, and thus can be used to calibrate the image captured with aid from a computer program or a person or both). The seller can then provide the altered, improved image for the webpage or to a catalog printer. This is a partial solution, as it can improve the image eventually rendered to the buyer. As noted, this is true for a website or color catalog or other rendering to show a more-accurate color for the image (here the blue-green shirt).

Second, and even if the seller does or does not alter the captured image based on the physical color standard, the seller can provide this physical color standard as captured with the image of the shirt or other item. Thus, in the eventual image rendered to the buyer, even at his or her own display (e.g., on a website on a buyer's smartphone or captured on a buyer's camera of a catalog item), the physical color standard is shown or accessible. If the physical color standard is captured in the image at the same time and/or under the same or similar conditions as the item's capture, the ability to correct the image taken is higher than if potential errors are introduced by capturing an image of the physical color standard at some other time (though if done under the same or similar ambient light and with a same or nearly same image-capture device, this can provide improved color rendering as well).

In this example, with the image of the item and the physical color standard (e.g., in a same captured image), the techniques can correct the image to accurately show the true color of the item. Here the true color includes at least a correct hue (e.g., red, green, blue), but the true color can also include a correct lightness, chroma, brightness, colorfulness, and saturation through corrections by the techniques. To do so, an application, such as one on a buyer's computer, can compare the physical color standard in the image with another physical color standard, such as one accessible by their rendering device or an accurate physical copy of the physical color standard. The techniques alter the rendered coloring of the item (e.g., hue, colorfulness, saturation, lightness, and/or brightness), and potentially other aspects as well, based on corrections made to render the imaged physical color standard taken with the item to match or nearly match a physical color standard of the buyer, such as one in the buyer's own locale.

For example, an application on an image renderer's device (e.g., a buyer's phone) may alter the color of the image to match the physical color standard, e.g., if the image's physical color standard is not properly depicted (e.g., not accurate or not congruent). This is effective to change the whole image of the item and standard until the physical color standard as rendered on the buyer's phone matches the physical color standard in the image renderer's locale, thereby also correcting the item's color. When the imaged physical color standard is properly depicted relative to the actual physical color standard, the item's depiction will also be proper, as the color change can be done to both the item and the imaged physical color standard at once (not required, but can be easier to perform than separately). Thus, assume that the imaged item and physical color standard show a misbalance of red/green or too little blue. The application can rebalance to match a local physical color standard until the imaged physical color standard is properly depicted (e.g., looks the same to the viewer). When the imaged physical color standard is properly depicted, the item's color will also be properly depicted (or more so than previously).

Furthermore, the techniques can ascertain whether a user's display is showing the correct color through knowledge of the display type, age, and so forth, as well as its settings. The techniques may then alter the displayed image based on matching to the correct physical color standard and the buyer's own device. This miscalibration of the buyer's device can also be corrected through the physical color standard by rendering an image of the physical color standard (e.g., with the device's own camera or received) and then calibrating the display to match the standard through device settings or a naked-eye comparison as noted herein. By so doing, the techniques enable a record of what changes to the display settings should be made should a proper depiction of a scene or item be desired. Note that many devices are intentionally calibrated to not be accurate or properly depict scenes, such as those with reduced blue light, or dimming for evening viewing, or altering displays to reduce power output.

In more detail, the techniques may also perform a calibration sequence, such as taking a picture of a color (here some or all of the physical color standard), and then showing it to the user of the device and having the user calibrate the displayed color to match. Doing this a few times with different colors and lightings can be sufficient for a more-accurate rendering of an image (even without needing to compare the physical color standard for each rendering of an item or scene).

Adjusting for Ambient Color

The techniques disclosed herein also solve the problem of different ambient light (e.g., in color or angle). For example, even if a capturing entity accurately captures the image, and even if the image on another entity's display is accurate, here meaning that it matches how the item looked by a typical human eye when the item was imaged by the capturing entity (e.g., the seller's own eye), the rendering of the item by later-rendering entity, such as a buyer on the buyer's display, may not be congruent with the buyer's current ambient conditions.

Consider a buyer looking at an item for sale on her smartphone. Assume, for this example, that the item is accurately rendered on the buyer's display. It may not match the situation in which the buyer is looking to place the item, however. Return to the off-white chair example. Assume that the light in which the item's image was captured was bright bluish-white light—e.g., non-natural light, or instead, that the item's image was captured in natural-wavelength light but that the buyer's house is illuminated with incandescent (slightly yellow), fluorescent, or light-emitting diode (LED) light. In any of these cases, the buyer's smartphone's rendering will not properly depict the item with the color that it would have if the item had been in the actual ambient conditions that the buyer is in currently and/or where the buyer would like to place the item (here the off-white chair). In such a case, proper depiction of the item is based on ambient conditions, rather than just color accuracy relative to the item or scene when it was captured.

The techniques can properly depict the rendered image on the buyer's display to show how the item would actually look in the buyer's locale. One way to do so is to sense, by a camera (e.g., a smartphone), the ambient conditions (e.g., perform spectral analysis on ambient light for color factors, e.g., light wavelength and intensity). This can be done through the smartphone's camera or other sensors to determine the wavelength and color characteristics of the current, ambient light (e.g., wavelength, energy, etc.). With this information, the techniques alter the rendering of the item on the smartphone such that the rendering is altered to take into account the difference between the ambient light in which the image was captured (if known), or at least the current ambient against the estimated/expected ambient lighting in which the image of the item was captured.

For example, if the item's image was captured in high-blue light, and thus the image is imbued with additional blue, the techniques can reduce the blue intensity for the rendered item. Similarly, if the ambient is fluorescent (assume here that it has a relatively poor color rendering index, or CRI), the techniques can correct for the difference in spectrum (e.g., in some fluorescent light, reds in objects are shown too dimly). Or, if incandescent, to adjust to reduce yellow in the rendered image (assuming a correlated color temperature, CCT, of 2700K). While sensors on the smartphone or other device can be used, as well as information about the item's image (known or assumed ambient for the item during original capture or altered image thereafter) can be used, other manners disclosed here may also aid in altering a rendering to match ambient conditions.

If, however, the image for the item was captured with the physical color standard, and assuming that the rendering entity (e.g., buyer) has (or had) the physical color standard, the current rendering of the image of the item can be altered such that the physical color standards match (the one captured with the item's original capture as well as the one of the buyer's). In so doing, the item can be rendered to be congruent with the buyer's conditions, even if that congruency would be less accurate, strictly speaking, than some other rendering. For example, the rendering on the buyer's smartphone may accurately represent the item as it was captured, but that may not be what the buyer desires. The buyer may desire to see what the item would look like if it were present, e.g., seen in real life or at least rendered to match the ambient conditions surrounding the buyer.

The techniques can make this adjustment automatically, based on an actual rendering of the physical color standard by the buyer's device (assuming that the buyer's camera and/or display are correctly calibrated as noted herein). Or, the techniques can provide a user interface whereby the user alters the rendered image of the item based on seeing the item and the physical color standard captured with the item along with another physical color standard, which the buyer can visually compare to the imaged physical color standard (or automatically as noted herein). Thus, the user interface can present red, yellow, and blue hues, as well as saturation and brightness (and other aspects of color), and the user can move each until the two standards match to that buyer's eye (these are but a few of many possible elements of color that can be selected to be changed through the techniques). The techniques also correct for differences in how people perceive colors, as the human eye may not match, in some linear fashion, the actual technical measurement of light.

Adjusting for Ambient Brightness and/or Luminosity

In addition to correcting for ambient hue, due to a difference in the hue of the ambient light versus the light in which the image was captured or altered and rendered, the techniques may also correct for ambient brightness. Similarly, as noted above, the techniques permit an item's image to be rendered to match the ambient brightness. Many products for sale are captured in lighting that is very bright relative to conditions in which a buyer would intend to use the item. Thus, the image presented, whether accurately captured and rendered or not, is not congruent with the buyer's current brightness. As above, the techniques also correct for brightness differences. One example includes decorations, such as a pillow to be used on a buyer's existing couch. This pillow, if typical, was imaged in high-brightness and often with a white background. Thus, the techniques may lower the brightness (and other measures of light) of the rendered image of the pillow such that it is congruent with the ambient brightness. By so doing, the techniques enable a rendering entity (here the buyer) to have a properly depicted rendering of the item or scene.

Augmented Reality

Continuing the pillow example above, assume that the pillow was originally captured in a slightly too-blue ambient hue, a high brightness, and on another couch not matching the buyer's brown couch. For a buyer to decide to buy the pillow, in conventional practice, the buyer often has to 1) trust that the image was accurately captured, 2) trust that the image is accurately rendered by the buyer's device, 3) correct for ambient lighting differences (e.g., red, green, blue) in his or her mind also to "guess how it would look," and/or 4) correct for brightness in his or her mind to "guess how it would look." Thus, the buyer would need to understand how the pillow would look with less blue and less brightness, as well as trusting that the image he or she sees is even accurate. Further still, many buyers would like to know how it would look with their own décor, such as the brown couch. Even one of these challenges can be a problem for buyers, while two, three, four, or five challenges, which is often the case, prohibits a good buying experience.

The techniques can also correct for one or even all of these five problems, thereby permitting a more-accurate and/or more-congruent rendering, which, through a more-proper depiction of an item or scene, improving users' experience with catalogs, books, websites, and so forth. For example, a buyer's experience and confidence in his or her decision to buy or not to buy an item can be improved.

The techniques can do so through use of augmented reality. In addition to, or alternatively to, one or more of the disclosed solutions, the techniques can present an item's image superimposed over the buyer's own conditions. Many smartphones can present real-time or nearly real-time rendering of a current capture of a user or the user's locale by the smartphone's camera, e.g., in real time on the smartphone's display. A previously corrected-for image of an item can be shown in the display, superimposed over the rendered reality. This image for the item can be previously corrected as noted above, or it can be corrected within the augmented reality interface. One way to do so is to use the physical color standard, such as one that has some three-dimensionality to it (this can aid in lighting angle, permitting customization of the item's rendering to match the lighting angle or being able to select a best-angled image from multiple images of the item taken at different lighting angles). Example physical color standards with 3D characteristics are a cube, tetrahedron, sphere, semi-sphere, and so forth.

Continuing the above example, assume that the buyer is interested in a salmon-colored pillow for fall décor. The buyer, having a brown couch, wants to know how the pillow would actually look on the buyer's brown couch. With the augmented reality, the buyer uses a mobile device, such as a tablet or smartphone, watches his or her own ambient and décor being shown, and then can move or have superimposed the item of interest, here the salmon-colored pillow, as it would look on the buyer's couch. To do so, the item can already be corrected for, and the augmented rendering of the local conditions shown accurately, and then the buyer has a good idea of how the item would look. However, many of the inaccuracies and incongruities of the image of the item can be corrected with the augment-reality technique. Assume that the buyer has a physical color standard and places it on his or her couch. Then, the buyer can correct the images presented on his or her display by comparing, visually to the buyer's own eye, the imaged couch and its physical color standard in the display, with what the buyer sees with his or her naked eye looking at the buyer's locale. With audio instructions, a touch interface, or other manners, the buyer can adjust the color (e.g., hue, brightness, colorfulness, saturation) of the couch as presented by matching his or her own matching of the naked-eye view of the standard with the standard shown on the buyer's display. Thus, the buyer's locale will be rendered accurately on the buyer's device. Further, the standard need not be some international or consistent standard as the same item being seen is also being rendered. Thus, a user may even be able to go without the standard by the techniques enabling the user, through a user interface, to adjust the colors and brightness so that the rendered couch matches the couch as seen by the buyer's naked eye.

The item is superimposed and properly depicted to account for the current conditions—this can be as noted above, or the item's image can be altered to match through use of the physical color standard in the augmented reality. Thus, a buyer can see the image of the item and the physical color standard imaged with it and adjust the color, such as red, green, blue hues, brightness, lighting angle, saturation, so that the item is rendered much more congruently with how it would look in the actual room, the actual lighting hue, lighting brightness, and lighting angle.

With a congruent salmon-colored pillow on the augment display, along with the local conditions (the couch, lighting, etc.), the buyer can then place the image of the pillow on the image of the couch, or the pillow can simply be centered or otherwise fixed, and the buyer can move the device and/or camera so that the pillow is oriented as desired on the couch. This augmented reality, in addition to the various benefits already noted, permits the buyer to "walk around" and get a better feel for the item and how it fits. The techniques can alter the lighting angle of the item as the user walks around, assuming that the item either has multiple images for different lighting angles, or the techniques can shade and highlight the item to approximate how the item would look with the light at the changed angle (as the buyer walks around, steps left, right, back and so forth). The techniques can do so in part based on sensing lighting-angle differences as the user moves, e.g., for a three-dimensional physical color standard in the user's location.

While the example given is home furnishings, clothing and other items can also be properly depicted. Even without the physical color standard, the techniques enable a buyer to image, in augmented reality or via snapshot, the color of the person's arm, for example, and then match the rendered arm with how the arm looks to the buyer's naked eye. By so doing, the rendering of the buyer's current conditions (arm, light, so forth) can be matched. Then, with the item's image made more congruent in any of the disclosed manners, the techniques present the item in the local conditions. Examples include how a scarf being sold on the internet matches a person's favorite jacket, hair color, and skin tone. Other examples include how a shirt's color would match, clash, or compliment a buyer's skin tone, hair, makeup color, and so forth. Further still, a makeup color can also be the item imaged, permitting more-congruent rendering of makeup and therefore improved buying decisions.

The techniques permit better depictions of imaged scenes and items, thereby improving a user experience when viewing a website, catalog, or social media, for example. When a user is a buyer, his or her decisions to buy can be improved. Consider, for example, use of a small, physical color standard with some three-dimensionality. With makeup imaged, such as lipstick, foundation, or rouge, and then using the techniques (with or without still-image or augmented-reality rendering), the item's color and how that color would look on a particular person can be more-accurately or congruently depicted. A makeup business, for example, could provide a foldable, small physical color standard with each purchase, or simply free online or in brick-and-mortar stores. Then, when a buyer would like to see how a catalog or online item would look on him or her, the buyer folds the physical color standard into some 3D shape and then uses the techniques to correct/make congruent the makeup's color and brightness and even lighting angle. The buyer may compare and alter the image of the makeup and its accompanying physical color standard to the buyer's own physical color standard, thereby altering the image to be congruent with the conditions in which the buyer's own physical color standard resides. Note that, by so doing, some purchases that would otherwise be performed in person can instead be performed remotely. This can especially aid buyers and sellers due to mobility limitations on many buyers, such as due to health concerns (e.g., the COVID-19 pandemic) or economic or ecological considerations, such as saving the environment or the buyer's resources by not driving to a store.

Sizing

In addition to, or alternatively to, the techniques described above, an image of an item may also be correctly sized. While this can be done in some manners noted above, the techniques also permit doing so through the following manners. First, the techniques can use information about an item, such as its height, width, and depth, and correct the image (including the angle at which it is presented) and then associate the size with the image. The size of the locale/ conditions, e.g., the buyer's body or décor, can be ascertained through direct entry of dimensions or through use of a mobile device's ability to measure items in an image, such as Apple's® measure app, which can measure dimensions of an item being rendered through augmented reality or a snapshot of local conditions, objects, and so forth. Rather than, or in addition to, these manners, the techniques may use the dimensions of the physical color standard. Assuming that the physical color standard in an imaged item and the physical color standard is present at the buyer's location are the same dimensions or that the difference in dimension is known, the techniques can scale up or down the image of the item for sale on the webpage (or even paper catalog) so that it is correctly displayed in scale on the buyer's mobile device (e.g., the salmon-colored pillow will be the correct size relative to the couch, thereby further improving the buyer's decision making).

This can be especially useful for furniture, décor, jewelry, clothing accessories, and clothing (when the clothing is imaged on a model/mannequin, as many clothing items when presented flat or folded are less useful for showing in scale). Assume that a buyer would like to know if a particular bracelet would look good on her arm. The techniques permit improved buying decisions for the buyer through improved rendering of the item for sale. The bracelet can be shown over a snapshot or augmented, real-time image of the buyer's own wrist, in a congruent color, congruent brightness, congruent lighting angle, and correctly scaled to the buyer's own wrist. This is a substantial improvement for buyers and sellers alike, even for non-website images, such as those in catalogs.

Example Environment

FIG. 1 illustrates an example system 100 in which techniques for more-accurate and/or more-congruent rendering of an imaged item can be embodied. System 100 includes a computing device 102, which is illustrated with four mobile examples: a laptop computer 102-1, a tablet computing device 102-2, a smartphone 102-3, and an electronic-book reader 102-4, though other computing devices and systems, such as desktop computers and netbooks, may also be used.

Computing device 102 includes computer processor(s) 104, computer-readable storage media 106 (media 106), display(s) 108, and input mechanism(s) 110. Media 106 includes computer-executable instructions that, when executed by the computer processor(s) 104, performed operations, such as those of an operating system 112 and an image module 114.

Image module 114 is capable of enabling or aiding techniques described herein, such as improving the accuracy and/or the congruity of an image at an image capture location (e.g., the disclosed seller) or an eventual image-rendering location (e.g., the buyer).

Image module 114 may also include or have access to history 116, user interface 118, and three-dimension module 120 (3D module 120). User interface 118 enables image module 114 to present, in user interface 118 on display 108, the rendered images (e.g., current user locale in an augmented reality with an item). The user interface 118 also permits, though input mechanisms 110, alteration by the user of the computing device 102 to alter a rendered image. 3D module 120 enables the image module 114 to alter, in some cases, an image to show a different angle or lighting angle, and/or scale for an item, such as in an augmented reality scenario. 3D module 120 can use a physical color standard within an image, with an item and a physical color standard in the device's locale to determine and alter a scale for the item. With use of measurement sensors, alternatively, the 3D module 120 can determine dimensions for the locale and then scale the item's size appropriately.

The image module 114 can, for example, provide a user interface through which to receive a user selection to alter a captured image of a physical color standard, as noted further below. The image module 114 receives the user selection and alters the captured images of the physical color standard and an item or scene. The image module 114 may also or instead correlate a portion of an item or scene shown in an image to a matching color within the physical color standard where the matching color has a known location on the physical color standard (or if the location can be determined). By so doing, and based on the recorded color information for the known location, an actual color for the portion of the item can be recorded. This enables a rendering to be more accurate n- or more congruent. Further, a change to cause the color of the portion to match instead the recorded color information can also be applied to all of the item, scene, or image, thereby improving the accuracy or congruity of the entire item or scene.

History 116 can include the various data described herein, such as information about ambient light at a user's location, prior selections by the user (e.g., the buyer or seller), information about a current display (e.g., calibration data generated as noted herein), and even data from other sources, such as other users' selections and display data.

Computing device 102 includes or has access to one or more displays 108 and input mechanisms 110. Four example displays are illustrated in FIG. 1, all of which are integral with their respective device, though this is not required. Input mechanisms 110 can include gesture-sensitive sensors and devices, such as touch-based sensors and movement-tracking sensors (e.g., camera-based), as well as mice (free-standing or integral with a keyboard), track and touch pads, capacitive sensors (e.g., on a surface of computing device 102), and microphones with accompanying voice-recognition software, to name a few. Input mechanisms 110 may be separate or integral with display 108; integral examples include gesture-sensitive displays with integrated touch-sensitive or motion-sensitive sensors.

Imager 122 can include visible or non-visible light sensors, such as cameras, IR cameras (and projectors), and so forth. Imager 122 may also sense ambient conditions, even without necessarily capturing an image. Further still, imager 122 can work with other components to provide the above-noted augmented reality and other renderings.

Example Manual Change to Image

Figure 2:
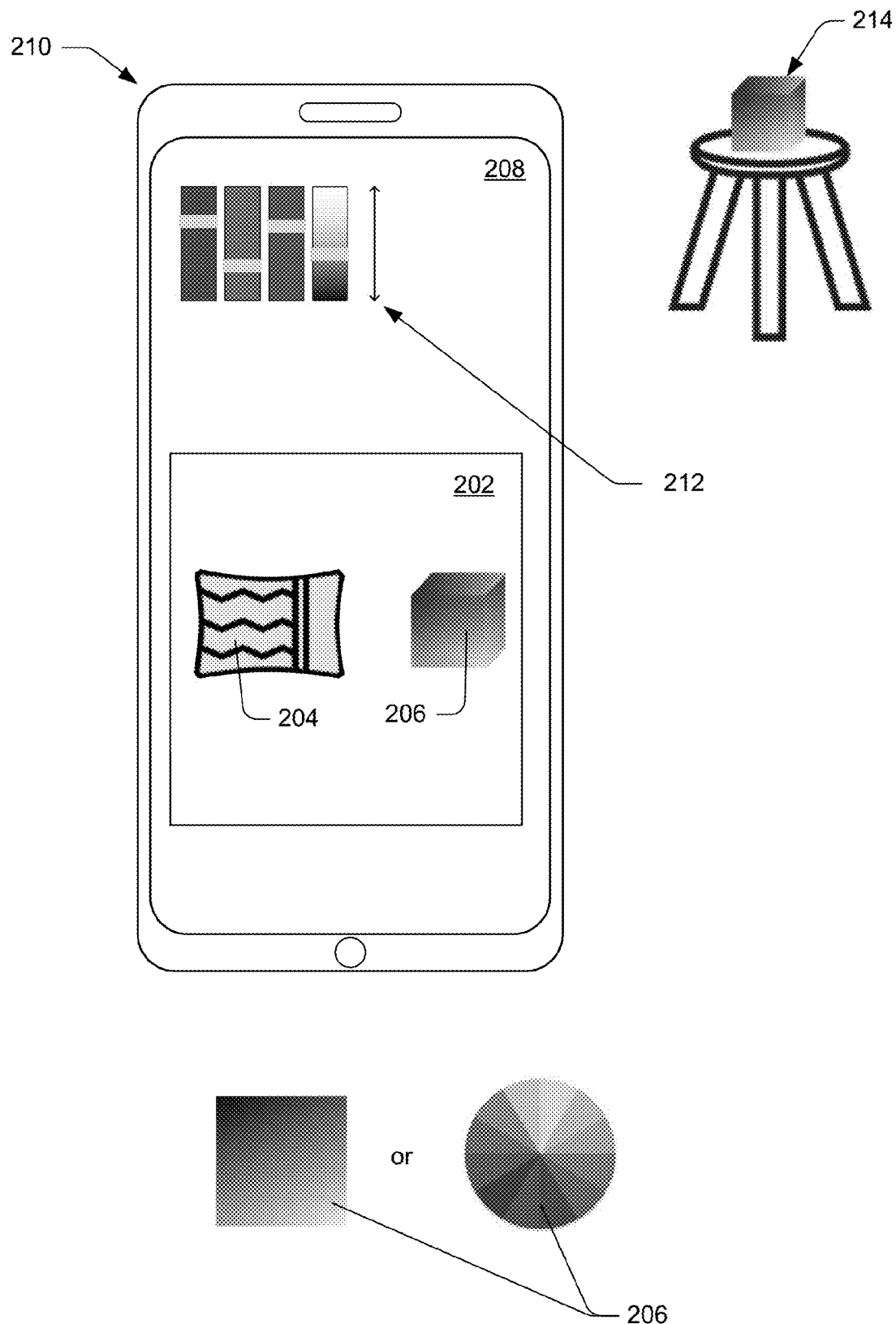
FIG. 2 illustrates an example user interface having an image of an item and physical color standards.

FIG. 2 illustrates an example in which the techniques enable a user to alter an image of an item. This alteration can correct, or make congruent a rendered image of the item to local ambient conditions, or simply correct an inaccuracy in the original image or the rendering of the image on the user's device.

As shown, the image module 114 presents an image 202 of an item 204 along with an imaged physical color standard 206 with a user interface 208 on a user device 210. The user interface is configured to receive a manual change to the image through any number of controls, from audio controls, gesture control, and so forth, such as wheel controls or slider-based controls 212 (here red, green, and blue hue, and brightness). The manual change is here based on a naked-eye comparison of the imaged physical color standard 206 with a local, real-life physical color standard 214.

Figure 3:
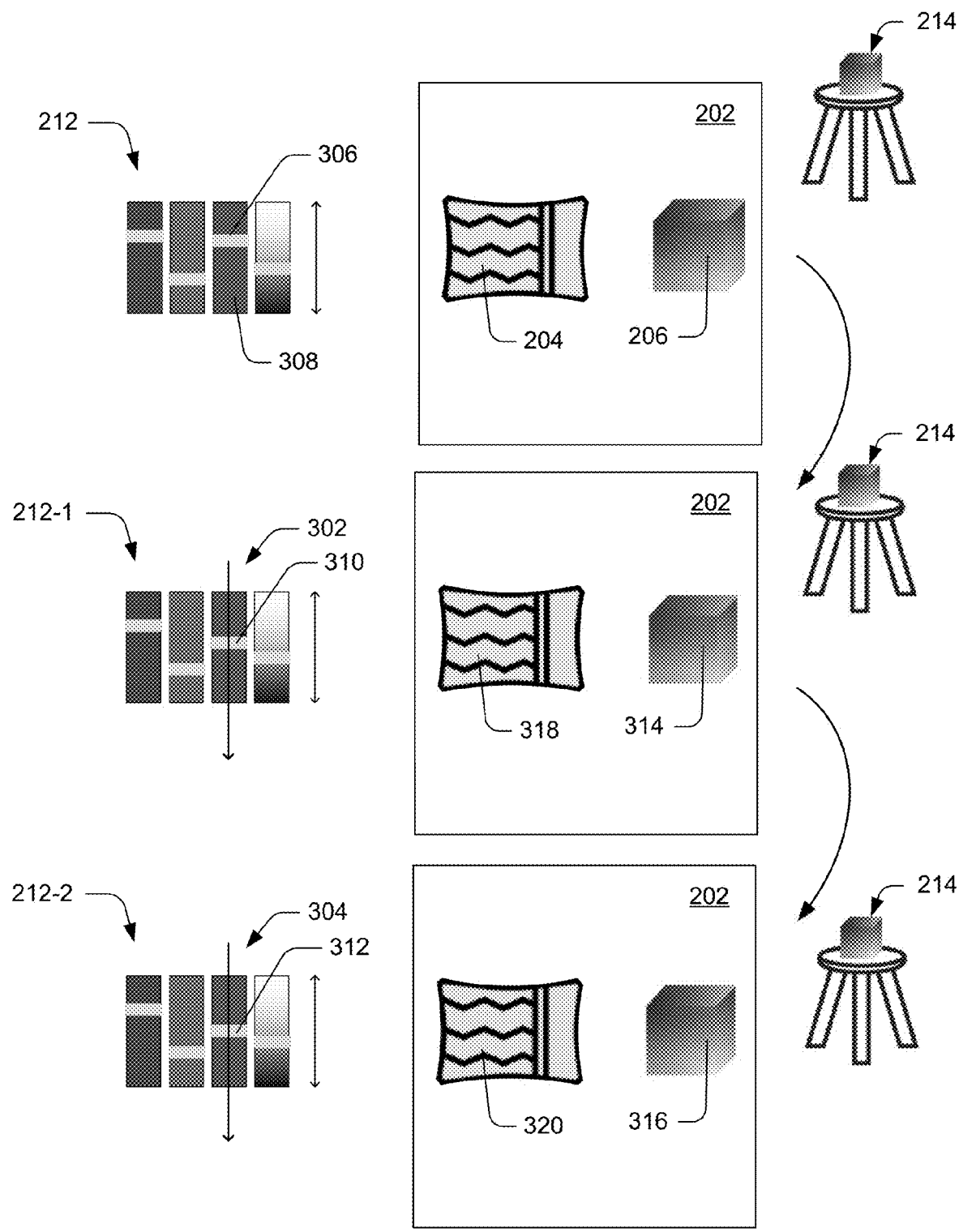
FIG. 3 illustrates an initial set of the slider-based controls and then two successive user selections and resulting alterations to an item and physical color standard.

By way of example, consider FIG. 3, which illustrates an initial set of the slider-based controls 212 and then two successive user selections, shown at 212-1 and 212-2. The user selection is shown with first selection 302 and second selection 304. The first user selection is to reduce the blue hue, shown with the grey line 306 for the initial set of controls 212, on the blue slider bar 308. The grey line is shown reducing the blue hue at reduced grey line 310. The second user selection further selects to reduce the blue hue, shown with further-reduced grey line 312. Note that the initial rendering of the image 202 becomes less and less blue, going from a pinkish-blue salmon color to an orange-salmon color. Note also that the physical color standard 206 is altered concurrent with the item (though this can be done prior to the item's color change). The original rendering of the physical color standard becomes less blue and then further less blue, shown at 314 and 316, respectively. Here note also that the real-life physical color standard 214 now matches the less blue standard 316. Thus, as the standard rendered more-closely matches the real-life standard, the item 204 also becomes more-closely congruent and/or accurate with the user's locale, shown at improved rendering 318 and further-improved rendering 320.

Thus, the image module 114 receives the manual change through the user interface 208 and then changes the image 202 based on the received manual change. This image, once altered, is rendered or saved for later use, though this alteration can be in real time, delayed, or simply provided to another interface, such as an augment-reality interface 216 shown in FIG. 10. Note that this user interface 208 can be augmented reality (presenting a color image of the user's locale along with the imaged item and physical color standard) or an interface that does not present the user's locale in the interface.

Example Method for Color Rendering

Figure 4:
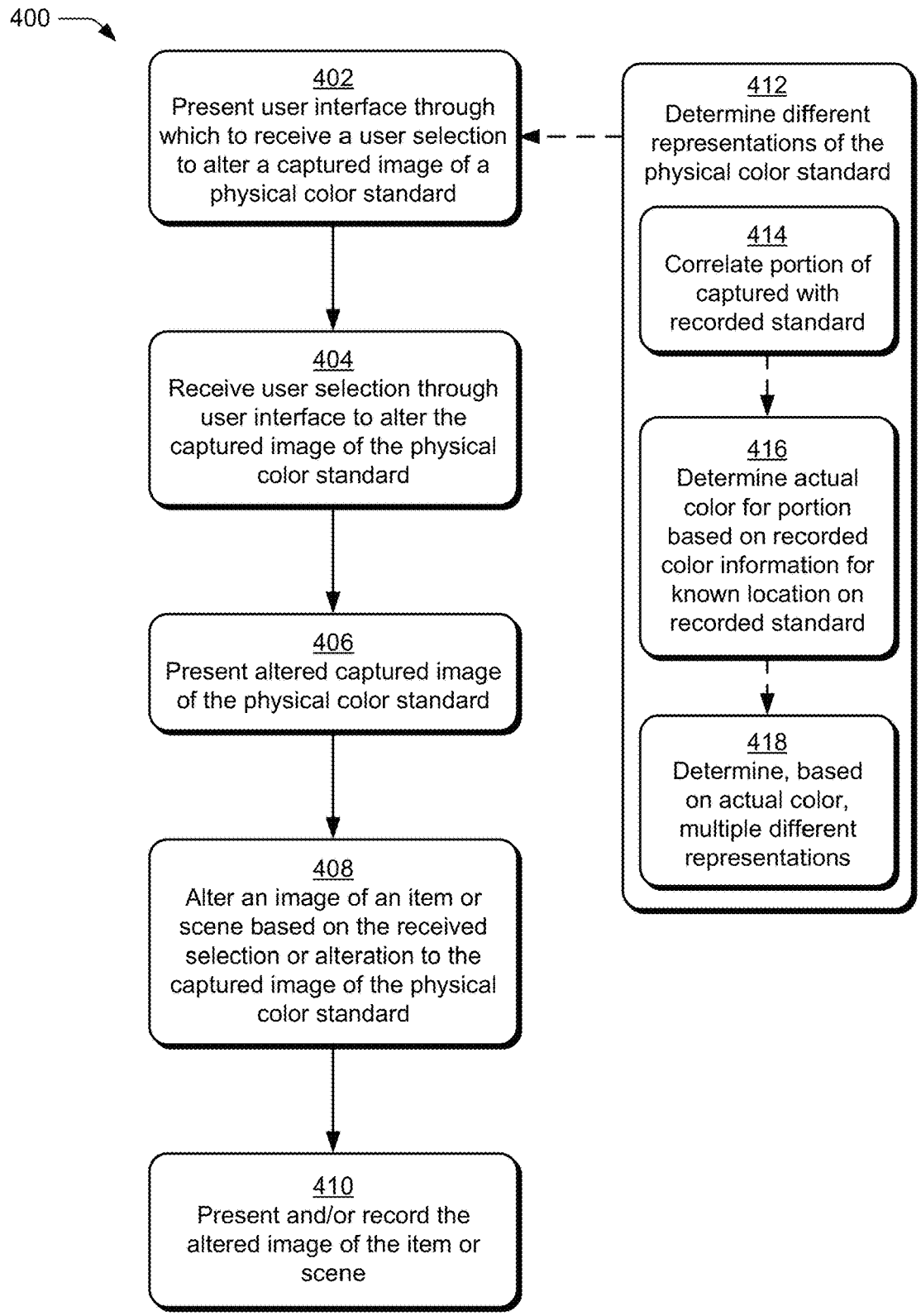
FIG. 4 illustrates an example method by which the techniques improve an accuracy or congruity of an item or scene.

Below is an example method 400 (illustrated in FIG. 4) by which the techniques improve an accuracy or congruity of a current or future rendering of an item or scene (e.g., anything that can be imaged). For all methods disclosed herein, the operations may be reorganized (e.g., in a different order than shown), iterated, repeated, and combined, if the context allows. The ordering shown is not required except as set forth herein.

Figure 9:
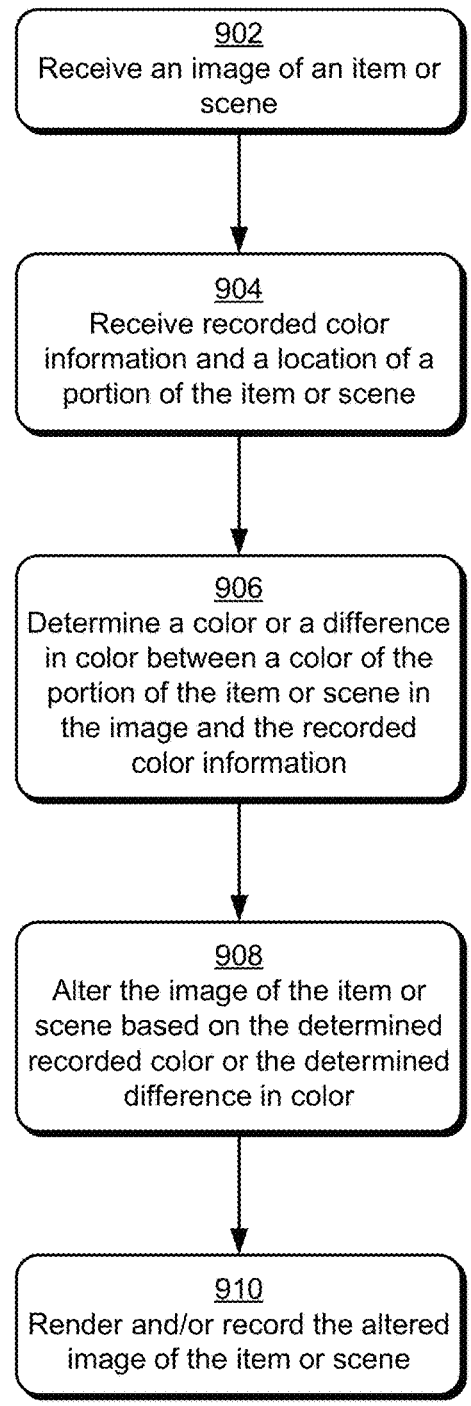
FIG. 9 illustrates an example method by which the techniques improve a rendering of an item or scene to be more accurate or congruent.

At 402, a user interface is provided through which to receive a user selection to alter a captured image of a physical color standard. Example user interfaces are shown in FIG. 2, FIG. 3 (in part), FIG. 5, FIG. 6, and FIG. 9, as well as the description of the techniques above. In FIGS. 2, 3, and 9, for example, user interface 208 provides slider-based controls 212 by which to alter a color of an image.

Also as noted herein, the method can provide a user interface with multiple selectable controls, each of the multiple selectable controls presented with a different representation of the physical color standard. This can aid a user in selecting quickly or iteratively. Consider, for example, FIG. 5, which illustrates a range of five different brightness choices though a user interface 502 (this is one example of the user interface 118) on the smartphone 102-3.

At 404, the user selection to alter the captured image of the physical color standard is received through the user interface. Examples of selections through a user interface are described above, such as a user interface that enables reception of a user selection through a user control that, through manual selection, changes a color of the captured image of the physical color standard. As noted herein, the change in color can be a change to alter a hue, colorfulness, saturation, lightness, or brightness of the captured image of the physical color standard. A manual selection to change a color is illustrated in FIG. 3 and described above, with a user selecting to reduce a blue hue of a captured image.

Figure 5:
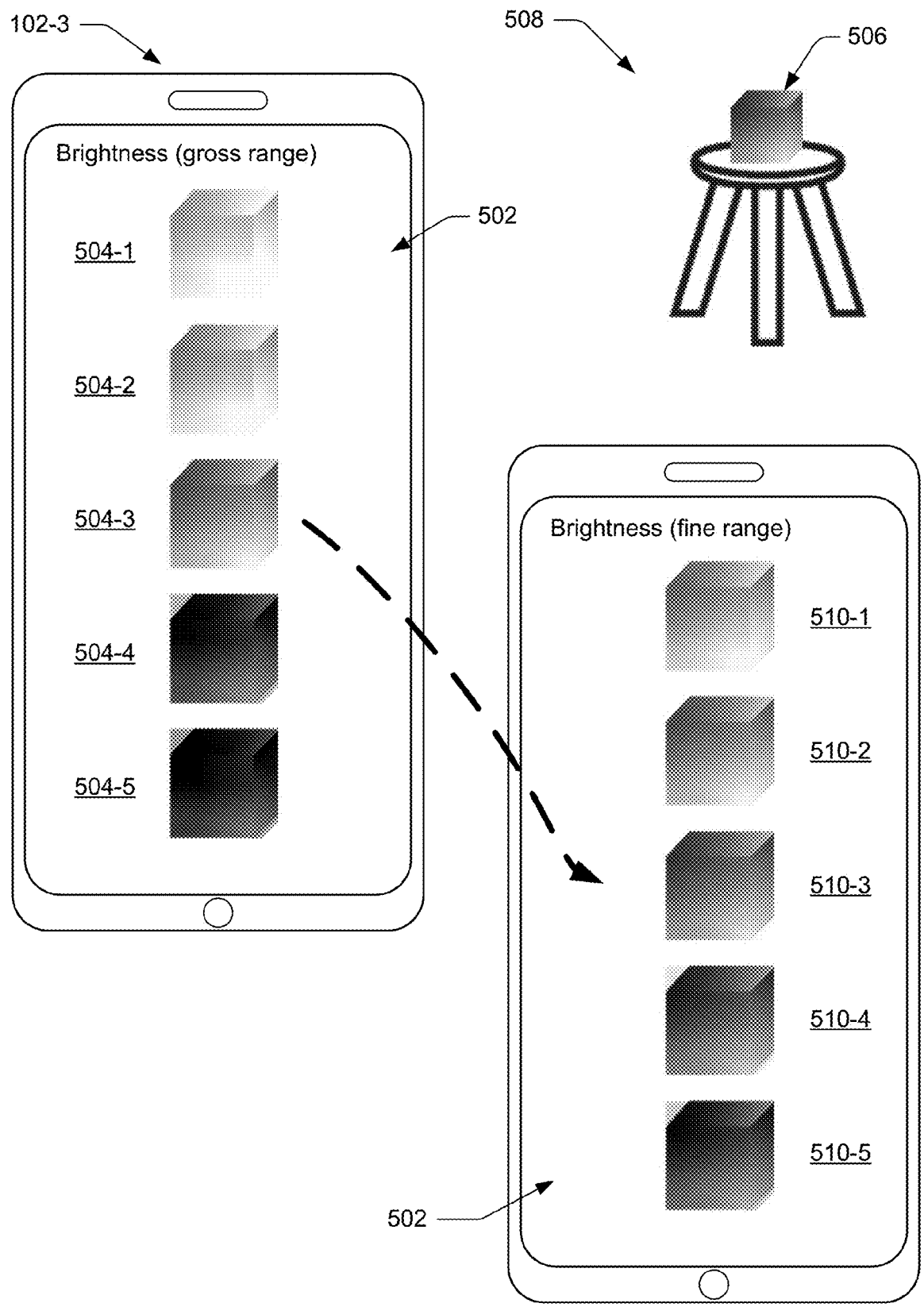
FIG. 5 illustrates a range of different brightness choices selectable though a user interface.

Continuing the example of FIG. 5, the user interface 502 enables selection of a broad range (gross range) at brightness 504-1 through 504-5, such as with a simple tap gesture on the display, of one of the five presented images of the physical color standard, each showing a different brightness. As noted, FIG. 5 also shows the physical color standard 506 in a user's locale. Each of these operations can be iterated, re-performed, altered and performed, and so forth. An example of this is also shown in FIG. 5, where finer gradations of selection (e.g., fine-range brightness 510, with five finer-gradations of selectable brightness, 510-1, 510-2, 510-3, 510-4, and 510-5) or with different categories of color alterations, e.g., after selecting a brightness, the techniques may present differently hued options, different saturation, and so forth, but with a brightness at or near the selected brightness.

At 406, the altered captured image of the physical color standard is presented through the user interface or another user interface and based on the received user selection. Many examples of this are described herein, such as at FIG. 3, which illustrates the altered, captured image of the physical color standard 314 and then further altered at 316, showing less blue than 314 and 206. Continuing the example of FIG. 5, selection of one of the brightness ranges, here 504-3, results in presentation of fine-grade alterations (as well as a reproduction of the selected brightness 504-3) of the physical color standard, shown at 510-1, 510-2, 510-4, and 510-5. While not required to be performed by the method or a particular element described above, some entity alters the image prior to the presentation at 406, such as a remote entity or image module 114.

At 408, an image of an item or scene captured in a same locale as that in which the captured image of the physical color standard was captured is altered. This can be altered based on a received selection or numerous received selections, such as those described in FIG. 3 or FIG. 5, to alter the captured image of the physical color standard captured in the same locale as the item or scene. This alteration of the image of the item or scene, and therefore a more-accurate or more-congruent rendering of the item or scene, can be performed separately, together, or contemporaneously. In the example shown in FIG. 3, the image module 114 alters the captured image of the physical color standard and the image of the item or scene in one contemporaneous operation, such as when the item or scene is captured in a same image as the physical color standard. Thus, as the physical color standard is altered in FIG. 3, the item is also altered, both of which are presented in the user interface 208 (not shown in FIG. 3 for visual brevity).

At 410, the altered image of the item or scene is recorded or presented. Presentation of the altered image of the item or scene is shown in FIG. 3 at 320. The alteration can also or instead be recorded, thereby recording the change in color caused by the alteration of the physical color standard. This record of the change is effective to enable a future change to a future image to cause the future image to more-accurately or more-congruently be presented. Thus, if the image of the item or scene is sent to another viewer along with the record, the image or scene can be rendered more accurately based on that record. If the eventual display used to render the item or scene is similar in settings and/or display type, this further aids in the rendering be more accurate or more congruent. Further alterations can also be made, as noted herein.

If the record, or a combination of records, shows changes to images selected by the user for a display associated with the user, the record can later be used to automatically correct a future-received or captured image. This is a form of automatic alteration based on what is a calibration of the user's display or, if the user is capturing the image, a calibration of the user's imager and the display 108. This can be saved in history 116 of FIG. 1. By so doing, the method 400 may automatically alter another image of another item or scene where the other image of the other item or scene captured in the same locale. This automatic alteration is based on a difference between the altered captured image of the physical color standard and the captured image of the physical color standard, or a user selection as noted herein.

While the physical color standard is illustrated as a 3D color box with a broad range of hues, other physical color standards can be used. For example, if the item or scene is a makeup product, the physical color standard may include a range of human skin tones at higher resolution or with a smaller physical size of the standard. Other examples include use of a physical color standard with higher-resolution human hair and skin tones, brightness, or even saturation than the illustrated physical color standard. Further still, if the item is a decoration item, a different standard for in-home ambient conditions can be used. If the scene is a picture of a person, to gain a more-accurate rendering, the physical color standard may include the hair, skin tones, and range of clothing colors. If the scene is a landscape picture, the range of colors present in outdoor locales can be represented in the physical color standard.

As noted in part above with the description of FIG. 5, the techniques can provide multiple selectable controls presented with a different representation of the physical color standard. Generally, at 412, different representations of the physical color standard are determined. These can be determined in various manners, including through the following operations. At 414, a portion of the captured image of the physical color standard is correlated to a matching color within a previously recorded image of the physical color standard or a copy of the physical color standard, the matching color having a known location on the previously recorded image of the physical color standard or the copy of the physical color standard. The matching color can be a matching hue, colorfulness, saturation, lightness, or brightness. At 416, based on recorded color information for the known location, an actual color for the portion of the captured image of the physical color standard is determined. And, at 418, based on the actual color for the portion, the different representations of the physical color standard are determined, such as multiple representations that are of a finer range of color options, thereby enabling a faster or more-precise selection. Thus, the image module 114 is able to present what are likely to be closer matches and better selectable choices.

Figure 6:
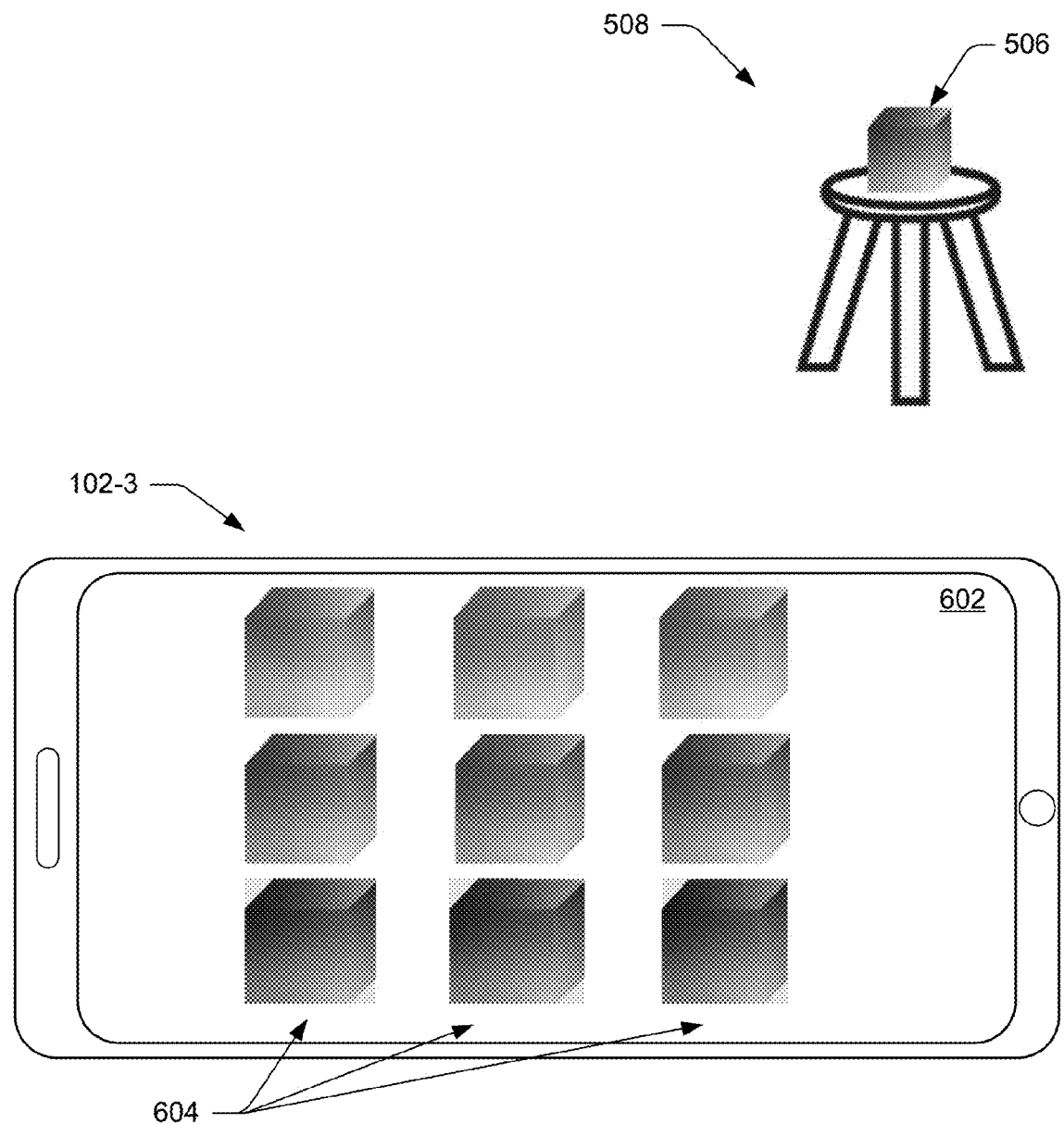
FIG. 6 illustrates a range of nine different hues and levels of brightness presented through a user interface.

For example, consider FIG. 6, which illustrates a range of nine different hues and levels of brightness presented through a user interface 602 (this is but one example of the user interface 118) on the smartphone 102-3. Here, the user interface 602 enables a selection of nine color/brightness ranges 604, such as with a simple tap gesture on the display, of one of the nine presented images of the physical color standard, each showing a different color and brightness. As shown, the left column has a higher red, the right higher blue, the upper row higher brightness, and so forth. In these examples, selectable and different representations are determined as shown in the alternative operation 412, resulting in the nine different representations, each of which is based on determining an actual color and then presenting options that are near to, or surrounding that actual color, such as through a similar hue balance, brightness, saturation (not shown), and so forth.

As noted above, the methods herein can be repeated, iterated, and so forth. For example, on selection by a user, either to select different characteristics or even multiple characteristics at one interface (e.g., a grid of brightness and hue shown in FIG. 6), the image is altered until the user is happy with the match to the physical color standard (e.g., 506). As noted, the user may instead or in addition manually alter the color through the interface (e.g., audio input to "increase brightness and reduce red," or through slider controls 212, and so forth).

Returning to the operation 412, instead of performing the operations 414, 416, and 418, alternatively or in addition, the operation 412 determines the different representations through a prior-performed calibration. This calibration can be performed explicitly based on a human-selectable comparison to calibrate a display on which the user interface is presented or can be based on the record in which one or more prior changes to the color of an image of a physical color standard is rendered on a same or similar display. One example is where the image module 114, with imager 122, captures an image of a physical color standard in a user's locale. Then, using parts of the method 400, the user manually alters the rendering to match what the user sees of the real-life physical color standard. In so doing, the alteration is a form of calibration of the display. In some cases, however, the alteration may take into account inaccuracies in the imager 122 and may therefore be a less-than-perfect calibration.

Example Method for Color Rendering Through Color Matching

Figure 7:
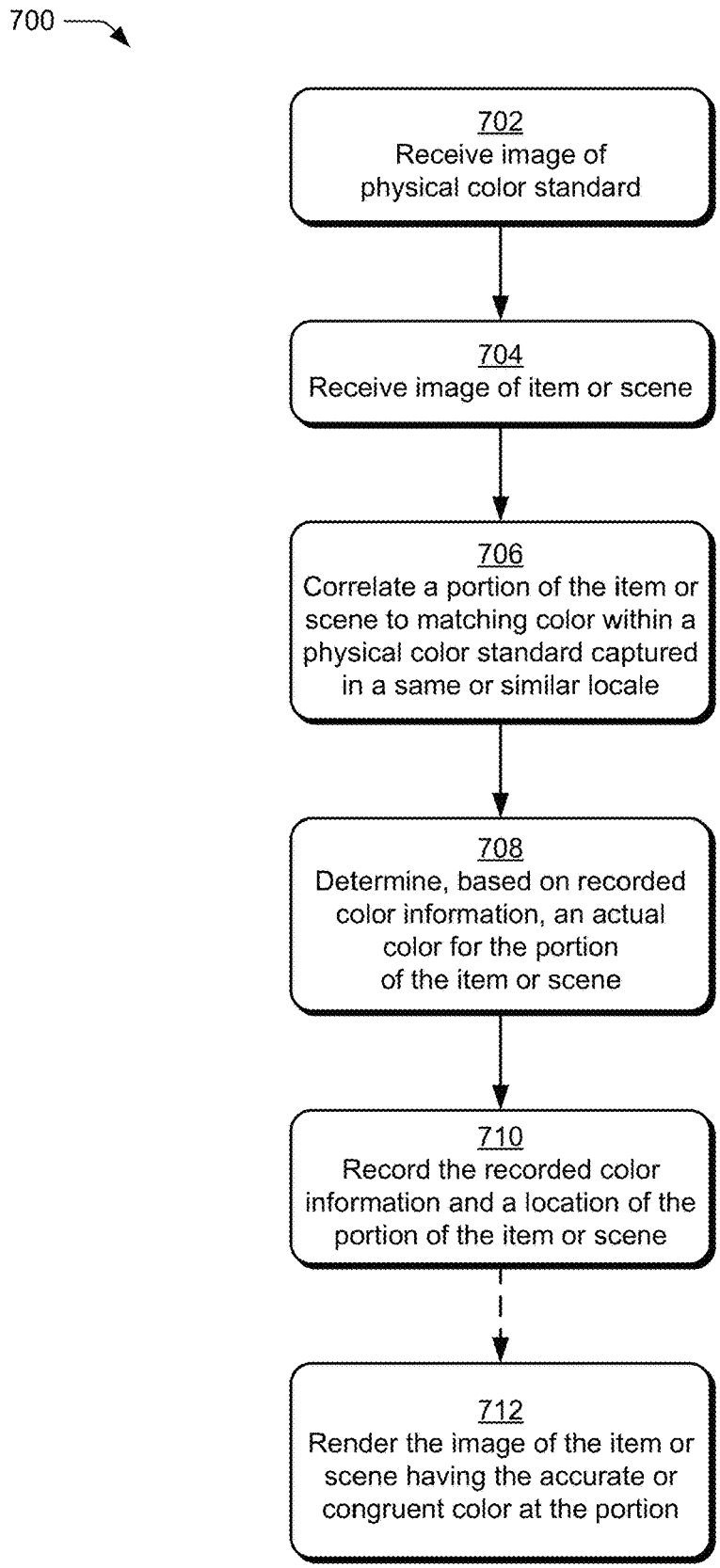
FIG. 7 illustrates an example method by which the techniques improve, through color matching, an accuracy or congruity of a current or future rendering of an item or scene.

Below is an example method 700 (illustrated in FIG. 7) by which the techniques improve, through color matching, an accuracy or congruity of a current or future rendering of an item or scene. For all methods disclosed herein, the operations may be reorganized (e.g., in a different order than shown), iterated, repeated, and combined, if the context allows. The ordering shown is not required except as set forth herein. Note that the method 700 can be performed without user interaction, in whole or in part, and thus can be automatically performed, such as by the image module of FIG. 1, except where an explicit user interaction is described.

Figure 8:
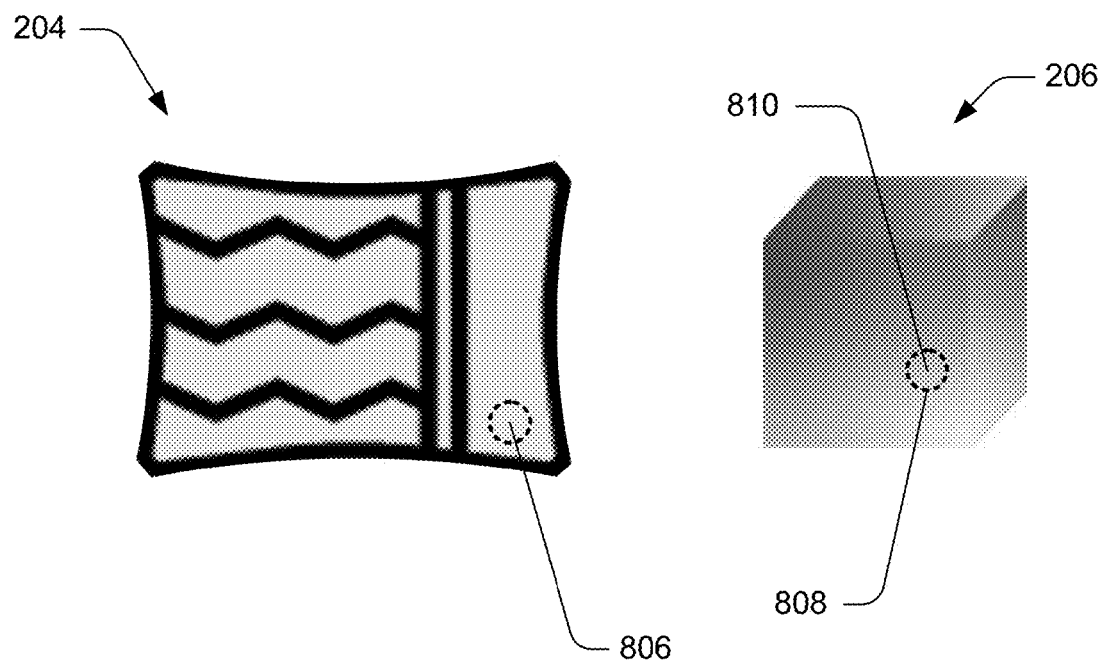
FIG. 8 illustrates an item, a physical color standard captured with or near the item, and an accurate or corrected color standard having a known color and location.
Figure 8:
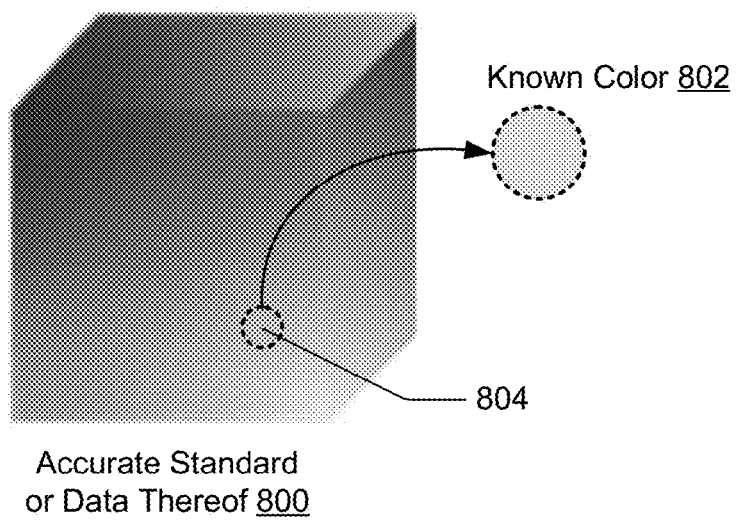

At 702, an image of a physical color standard is received. The physical color standard has a known color in a known location within the physical color standard. This physical color standard can be one that is calibrated or otherwise known to be accurate, as noted at accurate standard 800 in FIG. 8, or data that represents the standard in a machine-usable format. FIG. 8 illustrates a known color 802 and location 804 on the accurate standard 800. This does not have to be shown to a user; it can instead be non-visual and/or performed solely by a computer process (e.g., the image module 114 having instructions to cause the processor 104 to perform the operations of method 700) using the image or a data file having the known location and known color. The location can be cartesian or otherwise.

The known color 802 is known for at least a hue and may also be known for other characteristics of color. The location 804 is also known and correlated to the known color 802. While not required, the known color 802 in the known location 804, within the standard 800, can be determined through a calibration, the calibration based on a human-selectable comparison to calibrate a display on which the user interface is presented.

At 704, an image of an item or scene is received. The image of the item or scene and the image of the physical color standard are a same image, images captured contemporaneously, or images captured in a same locale, such as a same location or a same ambient condition.

At 706, a portion of the item or scene shown in the image of the item or scene is correlated to a matching color within the physical color standard, the matching color having the known location on the physical color standard. The physical color standard in one captured in a same or similar locale, such as within a same image as the item or scene. The correlation of the portion of the item can include sampling multiple portions of the image of the item or scene with known colors of the physical color standard or vice versa, and where the portion correlated is responsive to a match based on the sampling. Further, this correlation can be to match a hue, colorfulness, saturation, lightness, or brightness of the portions.

Consider, by way of example, FIG. 8, which illustrates the image 202 of the item 204 of FIG. 2, along with the physical color standard 206 within the same image 202. At 706, the image module 114 correlates a portion 806 of the item 204, the portion 806 having a matching color to that of a portion 808 of the image of the physical color standard 206. Note that the color rendered on the image of the physical color standard 206 may or may not be correctly rendered, but if the item 204 and the image of the physical color standard 206 are both incorrectly rendered in a similar manner, the item's color can be corrected.

At 708, based on recorded color information for the known location, an actual color for the portion of the item or scene is determined. Here the portion 808 is at a location 810, the location 810 on the image of the physical color standard 206 mapped to the location 804 of the accurate standard 800, which is correlated to the known color 802. The known color 802 is the actual color that the portion 806 of the item 204 should be rendered.

At 710, the recorded color information and a location of the portion of the item or scene are recorded. This recording is effective to enable a future rendering of the image of the item or scene to correctly represent an accurate or congruent color, in a future rendering, of the portion of the item. In the illustrated example, this recorded color information is the known color 802 and the portion 806 of the item 204.

At 712, the techniques may render, based on the recorded color information and the location of the portion of the item or scene, the image of the item or scene having the accurate or congruent color. While not required, this rendering of the item or scene having the accurate or congruent color enables a user to check this accuracy or congruity and alter it according to various manners noted above (e.g., operation 404 of method 400).

Method for Color Rendering Using Recorded Color Information

Below is an example method 900 (illustrated in FIG. 9) by which the techniques improve a rendering of an item or scene to be more accurate or congruent. For all methods disclosed herein, the operations may be reorganized (e.g., in a different order than shown), iterated, repeated, and combined, if the context allows. The ordering shown is not required except as set forth herein. Note that the method 900 can be performed without user interaction, in whole or in part, and thus can be automatically performed, such as by the image module 114 of FIG. 1, except where an explicit user interaction is described.

At 902, an image of an item or scene is received. While not required, the recorded color information and the location of the portion of the item or scene can result from operation of the method 700. In such a case, the image can be received from a remote device that performed the method 700 or a same device as performing the method 900 if the method 700 was performed on the same user device (e.g., the computing device 102).

At 904, recorded color information and a location of a portion of the item or scene are received. The recorded color information and the location of the portion of the item or scene indicate an accurate or congruent color of the portion of the item or scene at the location. The recorded color information and the location indicate the accurate color of the portion of the item or scene at the location, rather than a congruent one to a user's ambient condition, and further include receiving, through a user interface, a user selection to further alter the rendering of the altered image of the item or scene. In such a case, the further alteration can be based on a local physical color standard in a locale viewable by a user, the further alteration effective to improve a congruity of the altered image of the item or scene to ambient lighting conditions of the locale.

At 906, a difference in color between a color of the portion of the item or scene in the image and the recorded color information is determined.

At 908, the image of the item or scene is altered based on the determined recorded color or the difference in color. Note that the change to this portion's color to match the recorded color can be performed on just the portion or all of the item or scene, or anywhere in between. Thus, a change to reduce a red hue and increase a saturation of a portion of an item to match a recorded color can be applied to more than the portion. This enables a change to be made without in-depth analysis of each portion of the item or scene. In this document, the term "alter" is used to mean various changes to an image, including producing a new image, altering a file for an image, and then using the altered image, and so forth. The term alter is not intended to require use of the same image or data file for the image, as a new image or data file can instead be created, in which case the altered image is the new image.

At 910, the altered image of the item or scene is recorded or rendered. As noted above, the rendering of the altered image can be on the display 108, using a user interface 118, on computing device 102. The user interface, however, can be an augmented reality interface, which the 3D module can produce.

As noted in part above, the techniques enable calibration of a display to better depict an image. In such a case, a further alteration to the image can be performed automatically based on the calibration. Or the alteration can be received manually through a user selection to calibrate a display on which the altered image is rendered. This further alteration improves a congruity or accuracy of the altered image of the item or scene when rendered on the display.

Example Augmented Reality

Figure 10:
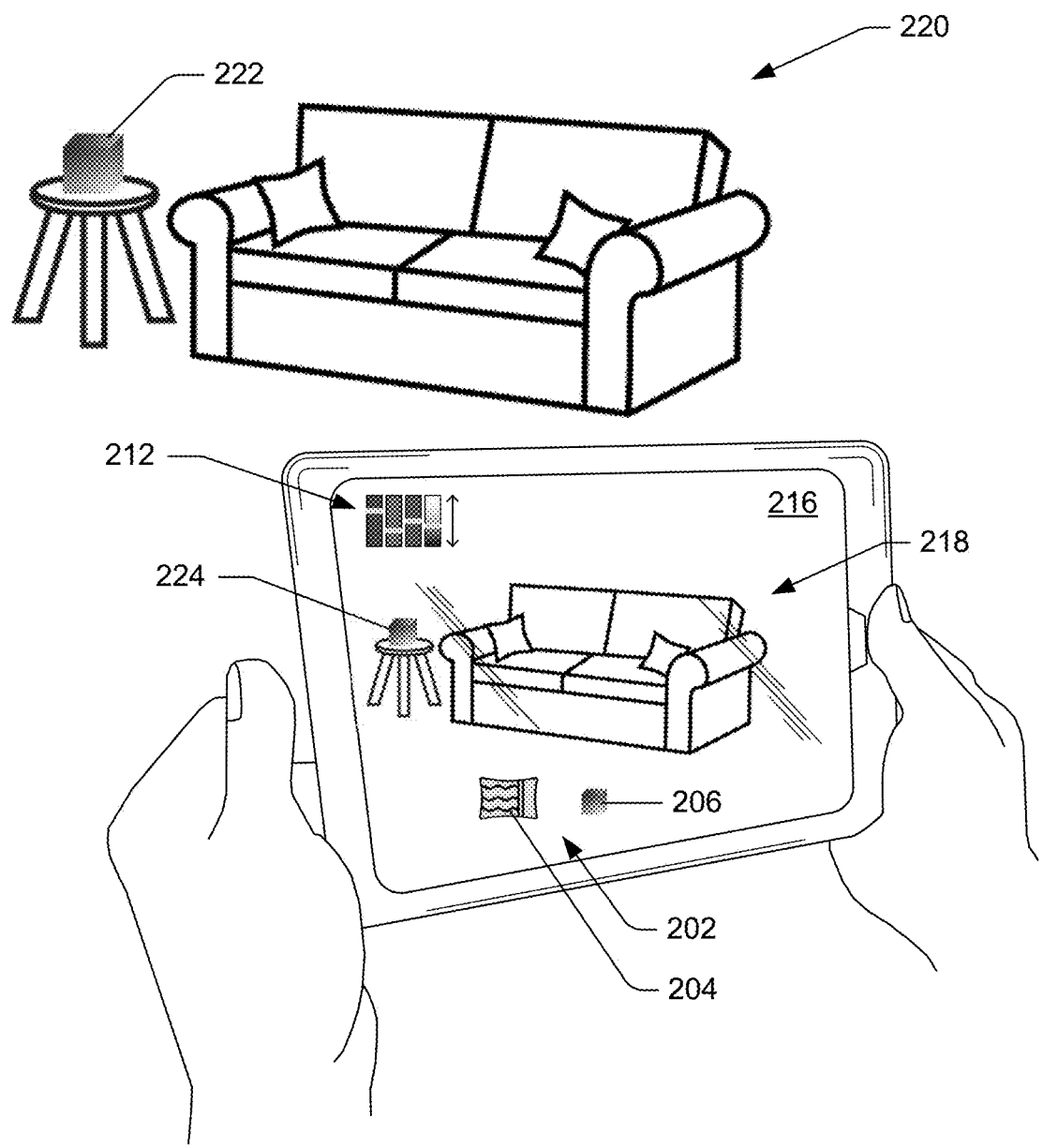
FIG. 10 illustrates an augment-reality interface presenting an image of an item and physical color standard, and showing a user's locale.

FIG. 10 illustrates but one example of an augmented-reality interface. Here, the augmented-reality interface 216 through which the item 204, the imaged physical color standard 206 (optionally, as prior correction may have been performed, e.g., see FIG. 2), and an imaged locale 218, which represents a physical locale 220, can be presented. Note that the image 202 of the item 204 and the physical color standard 206 are superimposed over the imaged locale 218. This example also includes the slider-based controls 212 through which a user may alter the brightness and color of the imaged locale 218 (and, separately, the item 204, which may have been previously corrected using the techniques). As noted above, a local, physical color standard 222 can be imaged in the augmented-reality interface 216 as an augmented-reality image 224. The augmented-reality image 224 can be altered until it matches the user's naked-eye perception of the local, physical color standard 222. In so doing, the item 204 as imaged and the locale 220 as imaged (at 218) can be congruent with the user's locale 220. Thus, the buyer may see if the salmon-colored pillow for sale matches his or her décor (here, the couch and table of the physical locale 220). Thus, the techniques permit alteration to images of an item for sale and the locale in which it is intended to be placed to correct inaccuracies and/or incongruities. While not shown, the user may instead alter the image 202 and the item 204 and place the user's display on the couch, which permits congruent coloring, but may make a correct size of the item 204 challenging (most pillows are larger than smartphone and tablet displays).

Additional Seller and Buyer Examples

Figure 11:
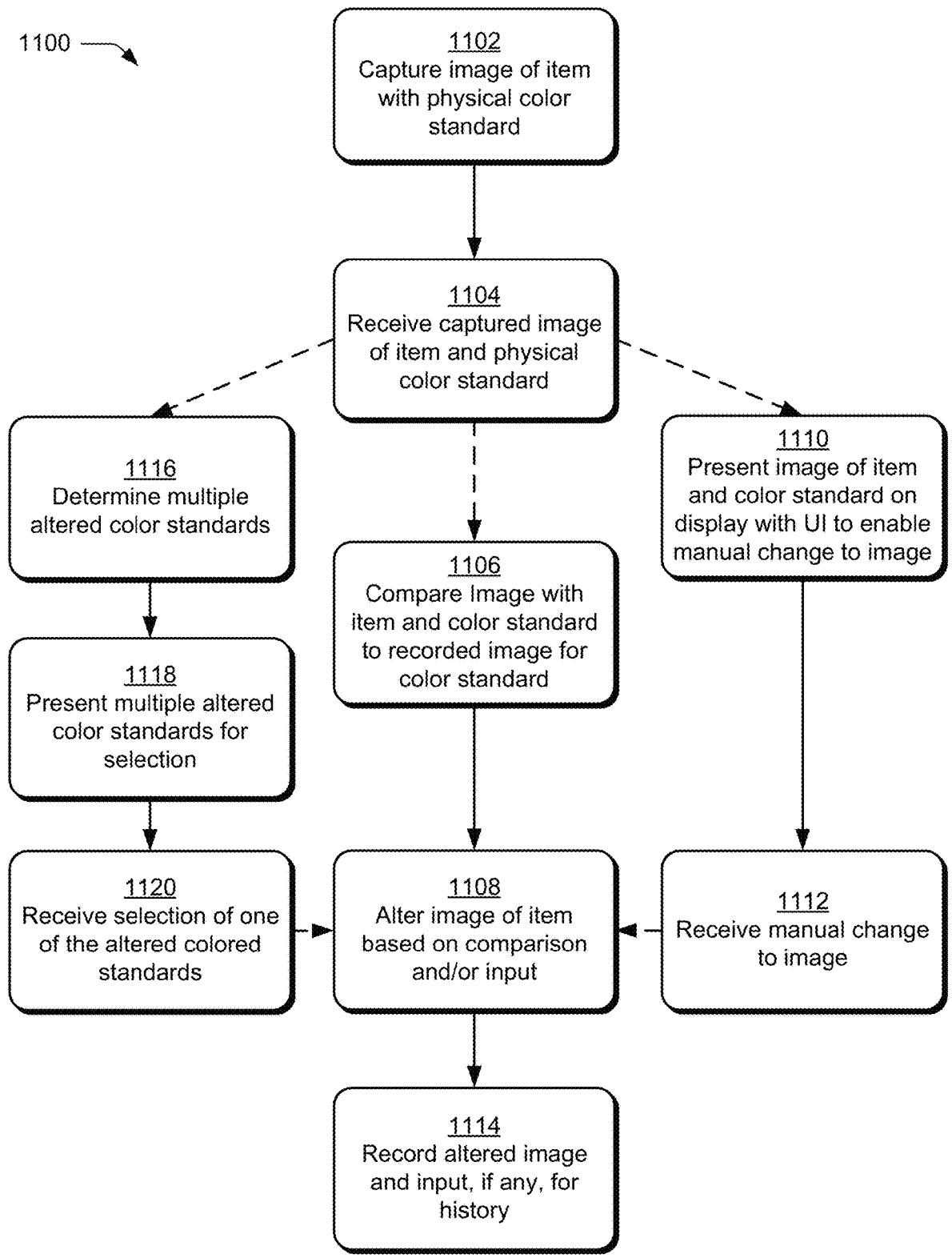
FIG. 11 illustrates an example method by which the techniques enable a seller to provide a more-accurately rendered image of an item or scene, such as one for sale.

Below is an example method 1100 (illustrated in FIG. 11) by which the techniques enable a seller to provide a more-accurately rendered image of an item, such as one for sale. For all methods disclosed herein, the steps may be combined, reorganized (e.g., in a different order than shown), iterated, repeated, and combined. The ordering shown is not required except as set forth herein.

At 1102, an image of the item is captured, along with a physical color standard. This can be performed in any of the above-noted manners, such as by a user with the imager 122.

At 1104, an application (e.g., the image module 114) receives the captured image of the item and the physical color standard.

At 1106, the application compares the imaged physical color standard in the captured image with a recorded image for the physical color standard, or data usable to assign an accuracy to, the imaged physical color standard.

At 1108, the application alters the image of the item and the physical color standard based on the comparison. The alteration of the image is effective to improve the accuracy of the image of the item. Note that this improved accuracy can be an accuracy for the ambient color in which the image is captured, thereby correcting camera error in rendering, and/or it can correct the image to a different ambient color, such as a recorded image of the physical color standard taken in a preferred ambient lighting (e.g., white light from the sun).

Alternatively, or in addition, at 1110, the application may present the item in a user interface enabling the seller to use his or her naked eye to adjust the image to match what the seller sees (e.g., the item as imaged to the physically present item or the physical color standard as imaged to the physically present physical color standard). At 1112, the application receives a manual change to the image (e.g., based on the user's naked-eye comparison of the physical color standard in the image with a locally present physical color standard). In so doing, the application (e.g., image module 114) alters the image of the item responsive to the user's input, then records the altered image at 1114. This can be done after, before, or in conjunction with other operations of the method.

Alternatively, or in addition, at 1116, the techniques can aid a seller in selecting multiple altered physical color standards by which to aid the seller in correcting the image of the item. As noted later in the context of FIGS. 5, 6, and 12, the seller may be similarly aided by the techniques to select a better-matching image of the physical color standard and thereby a more-accurate image of the associated item. The altered physical color standards are determined at 1116, presented at 1118, and selection is received at 1120. Ways in which these images can be determined, selected, and ways in which these steps can be repeated and arranged are set forth similarly in the description of FIG. 12 and illustrated in FIGS. 5 and 6. For example, the seller's own history of alterations in the past on his or her device or camera settings/preferences can be known and used to aid the techniques to provide altered images likely to be near the accurate, naked-eye view of the physical color standard, or a broader range can simply be presented and selected iteratively to determine an accurate alteration.

Returning to 1114, the altered image and/or input made to alter the image is recorded or provided, such as in the display as described in the user interface 208 of FIG. 2 (and FIG. 3), the augmented-reality interface of FIG. 10, and the user interface 502 of FIG. 5.

Example Method, Buyer Side

Below is an example method 1200 (illustrated in FIG. 12) by which the techniques enable a buyer to more-accurately or more-congruently render an image of an electronic format (email, text, social media, webpage, etc.) or a printed item or scene, such as one for sale. For all methods disclosed herein, the steps may be combined, reorganized (e.g., in a different order than shown), iterated, repeated, and combined. The ordering shown is not required except as set forth herein.

A simplified example method 1200 (illustrated in FIG. 12) is provided below by which the techniques enable a more-accurate or more-congruent image of an electronic (email, text, social media, webpage, etc.) or a printed item for sale.

At 1202, a captured image is received by an application. This captured image can be already improved as noted for the seller-side method, or it can be unimproved. In this method (but not some other manners described herein), the image is captured of the item along with a physical color standard. For printed images, such as catalogs and advertisements, the received image can be from a buyer's own device by capturing an image (e.g., taking a picture) of the printed image having the item and physical color standard.

As one option, at 1204, the application compares the imaged physical color standard in the captured image with a locally imaged copy of a same type of physical color standard as that imaged with the item (e.g., a copy). The comparison of the captured image to the locally imaged image for the physical color standard (e.g., by the image module 114) can be used to determine, for the ambient light in which the locally imaged image was captured, differences between the two, and then automatically adjust the image of the item and physical color standard. This improves an accuracy and/or a congruity of the color, such as hue, brightness, lightness, and saturation of the image for the item. Examples include reducing brightness to match a lower-light ambient, altering a red, green, or blue hue to be more or less present, and so forth. The techniques, at this operation, can use historical data to improve the image of the item as noted herein.

At 1206, the application alters the image of the item based on the comparison. At 1208, the image of the item is provided, such as to a device of the buyer. Note that if the device's display has flaws in accurate rendering, these can be corrected, or the user can compare the rendered, altered image to a physical color standard and, through his or her naked eye and a provided user interface, alter the image of the item further with a manual change, at 1212 and 1214 (or performed as part of 1206 and 1208).

Note that the method can be iteratively performed, or performed in real time and repetitively, such as when the ambient conditions are changing or the buyer's perspective for the physical color standard is changing.

Also, in some cases, an application on the seller side can perform a spectral analysis of the light when the image was captured, and this can be used by the application on the buyer side (which may be a same or different application) to aid in correcting the image of the item.

Also, in some cases, the techniques can use knowledge of the buyer's display's type, age, and flaws to help in altering the image, such as prior to any optional adjustment by the buyer of the image for the item. Furthermore, the image module 114 may enable the viewer (e.g., the buyer), such as previous to the method, to use the techniques to calibrate his or her display using an image of a physical color standard (received or taken by the buyer), and then alter the display's calibration through a user interface and with a naked eye looking at a local physical color standard. This can improve the display generally, or can provide calibration data so that, when an image is received that may be of import to the buyer for color (e.g., an item for sale), the calibration can be used by the techniques to improve the rendering of the item for sale (e.g., automatically at 1216 and 1218 or other method operations disclosed herein). This can be done with other manners or separately, such as doing so first, and then the techniques asking the buyer to alter the image through the user interface to further improve/alter the image.

Alternatively, or in addition, at 1216, the techniques determine multiple altered physical color standards. These may be determined using the many mentioned manners, such as device settings (for example, yellow "night time" coloring present for some displays, known characteristics of the device, e.g., reduces blue to save eye strain, and so forth), user-set preferences for device hue), user history (e.g., prior selection by a user indicating that the device's display renders images as imbalanced color, e.g., chroma, hue, luminosity), seller-associated history (e.g., seller is known to image items in a particular ambient light, etc.), and even current ambient conditions through sensors (e.g., a dark room, fluorescent or LED lighting, and so forth). On these bases, 1216 determines some range of hues (or other characteristics). These can be a final or first step in aiding the buyer to select a physical color standard imaged on the device that is close to the naked-eye physical color standard present at the buyer's locale. In some cases, however, a broad range is determined, which may include little or no analysis, but instead provide a broad range of choices for selection by the buyer, which then can be narrowed down (if the buyer would like further granularity, accuracy, and/or congruity) based on the prior selection.

At 1218, the techniques cause some number of these determined renderings of the altered physical color standard to be presented for selection. Consider, for example, FIG. 5, which illustrates a range of five different brightness choices though a user interface 502 (this is one example of the user interface 118) on the smartphone 102-3. Here, the user interface 502 enables selection of a broad range (gross range) at brightness 504-1 through 504-5, such as with a simple tap gesture on the display, of one of the five presented images of the physical color standard, each showing a different brightness.

At 1220, the techniques receive selection of one of the determined renderings of the altered physical color standard. Continuing the example, the user interface 502 receives a selection of one of the brightness 504 selectable images. Assume for FIG. 5 that the buyer selects brightness 504-3 as most-closely matching the buyer's naked-eye judgment against the physical color standard shown in the buyer's locale 508. At this point, operations 1216, 1218, 1220, and 1208 can be iterated one or more times, but with finer gradations of selection (e.g., fine-range brightness 510, with five finer-gradations of selectable brightness) or with different selections, e.g., after selecting a brightness, the techniques may present differently colored options, with different hue balance (or other characteristics) but with a brightness at or near the selected brightness.

For example, consider again FIG. 6, which illustrates a range of nine different hue/brightness range presented through a user interface 602 (but one example of the user interface 118) on the smartphone 102-3. Here, the user interface 602 enables selection of nine hue/brightness ranges 604, such as with a simple tap gesture on the display, of one of the nine presented images of the physical color standard, each showing a different hue and brightness. As shown, the left column has a higher red, the right higher blue, the upper row higher brightness, and so forth.

This can be continued, either to select different characteristics or even multiple characteristics at one interface (e.g., a grid of brightness and hue) until the buyer is happy with the match to the physical color standard (e.g., 214, 222, 506). The buyer may instead manually alter the characteristics through an interface (e.g., audio input to "increase brightness and reduce red," or through slider controls 212, and so forth).

Figure 12:
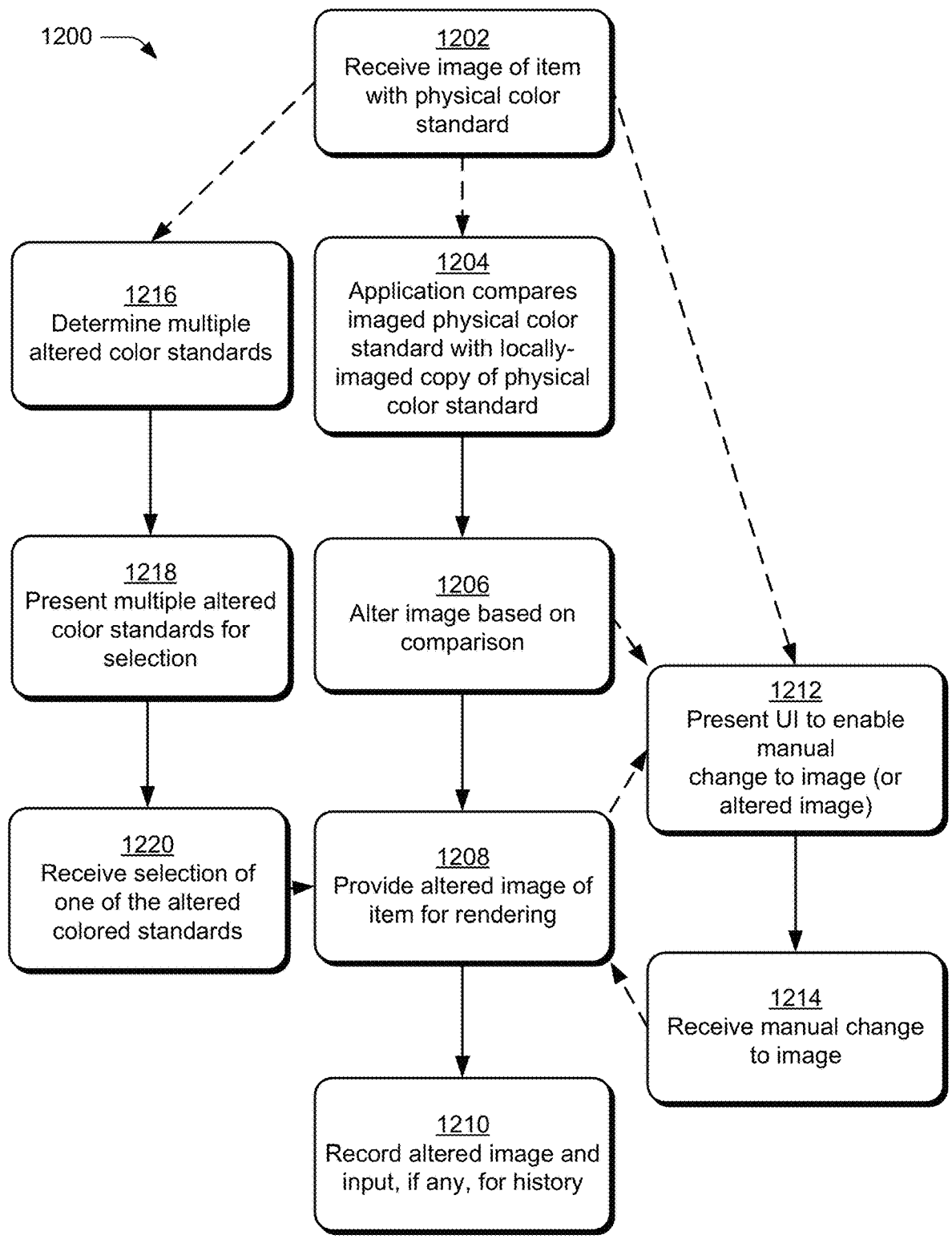
FIG. 12 illustrates an example method by which the techniques enable a buyer or other viewer to more-accurately or more-congruently render an image having an electronic format (email, text, social media, webpage, etc.) or a printed item or scene.

Returning to the method of FIG. 12, at 1210, the techniques optionally record any manual changes to hue or brightness input by the buyer to the buyer's device and/or the alteration. This can aid in further improving later performance of the application for future items. Thus, if a buyer alters an image, the application can learn what to change in the future, such as a buyer's selection to increase red in an image and correlate this increase in red to data about the image of the item and data about ambient conditions. Through this ongoing record of changes from a buyer to images, the application can learn how to better alter a further image for rendering on the buyer's display. This same data can be provided to other instances of the application or received from other instances and used to improve the automatic corrections by the application. For example, if another buyer alters a blue hue a particular amount for an image of an item (the same or different item) when the ambient light is of a particular character at the other buyer's device, this can be recorded and passed to/used by the buyer's application to automatically alter the image if the ambient lighting at the buyer's device is similar (or the contrast between the ambient light during the original capture of the image is similar). This data, however, can be optionally shared by the buyer's choice.

Additional Disclosure

The functionalities provided by the techniques enable capture of an image of a scene along with an established physical color standard (e.g., a color wheel, color bar, 3D physical color standard, having tens to even millions of colors, as the human eye can distinguish about 10 million different colors, etc.) and generate an image with true, representative colors. For example, when oriented for a provider of an image, such as a seller of an item online or through a catalog, the image module 114 enables the image of the item to be adjusted to more-closely match the true or congruent hue and luminosity of the item, as well as other factors.

To do so, the image module 114 calculates a difference between the captured image's physical color standard values and correct physical color standard values stored or accessible by the computing device 102. For example, assume a scene is captured containing a desired product and the physical color standard. The techniques can analyze the image and identify the physical color standard. The colors on the physical color standard represented in the image can vary depending on circumstantial factors that were present when capturing the image. For example, the scene may have been poorly lit, or the computing device's Auto-White Balance (AWB) functions may have been skewed. The colors represented in the image of the physical color standard can be compared to those of an established physical color standard stored within or accessible by an application configured to perform the techniques (e.g., the image module 114). The comparison will produce the difference between the hue values. Alternatively or in addition, the difference is known or determined from a rendering application or even rendering hardware, such as a graphics processing unit (GPU), which includes information about the color for each pixel rendered in the image. By comparing information about the color for pixels of an image of a physical color standard that has been corrected against pixels to render an image of a capture image of a physical color standard, the difference in color characteristics at the rendering level is determined. Note that these pixels can be correlated, such as by mapping in cartesian coordinates, between portions of each of these standards.

For example, the physical color standard in the image may contain a red hue value of R231 at a particular location (or pixel), while the established (or corrected) physical color standard on the application may designate that corresponding red hue at that location should instead be R220. Thus, the application would produce a difference of −11 as being the true red hue in the image (and thus the item or scene as well). The application may produce hue differences for all the physical color standard values until a representative image can be generated. Alternatively, true-hue bars and luminosities can be displayed in real time, and the user can adjust the hues per these bars. Even further, a spectral analysis of the light could be taken (e.g., with a light sensor) to ensure that the hues, brightness, and so forth are correct or congruent.

The functionalities provided by the techniques on the potential-buyer-end permit the user to visualize a more-accurate and/or congruent representation of an item's color. The techniques can retrieve the device's display metrics (e.g., screen type, age, settings) and analyze the physical color standard provided by the seller. By comparing the device's display metrics and the physical color standard provided by the seller, the techniques can then accurately portray the image's colors. For example, the image module 114 may determine the device's blue hue is displayed on a lower intensity than its red or green hue. Thus, an application configured to perform the techniques can calculate and display the image with respect to the device's display settings and the physical color standard provided by the seller. Alternatively, the application can determine the screen color through a calibration sequence, such as taking a picture of a color, displaying it, and having the user calibrate the displayed color to match. The calibration sequence can be repeated until representative colors are depicted. This calibration can be used to alter an image in methods described herein. Additionally, the application on a wireless-communication device (e.g., a smartphone, a tablet) permits the user to capture an image of the screen where an item (e.g., a product for sale) is displayed. The application on the wireless-communication device can alter the captured image based on the physical color standard provided with the image and the established physical color standard within the application (or viewed by the buyer instead or after initial correction by the application).

Note that color has many characteristics, such as hue, colorfulness, saturation, lightness, and brightness, to name a few. Hue, sometimes a color appearance parameter, can be defined based on a degree of stimulus, or a single number related to a color space coordinate diagram or color wheel (See FIG. 2). Or hue can be defined based on a dominant wavelength or that of its complementary color. Colorfulness and saturation are attributes of perceived color relating to chromatic intensity. These are formally defined by the International Commission on Illumination, though this formal definition is not required. In more detail, colorfulness can depend both on spectral reflectance and strength of illumination. Saturation is the colorfulness of an area judged in proportion to its brightness. Brightness is an attribute of color as well and is associated with a visual perception of radiating or reflecting light. Thus, a low-luminance object is not very bright. Lightness is sometimes referred to as a colors value or tone, and is a representation of brightness. Various models of lightness are present in the art, from Munsell and the HSL or HSV color models. As will be apparent to one skilled in the art of color, the characteristics of color are sometimes overlapping and often are based on perception of a user, which can vary from some users to others. This variance, however, can be addressed through the disclosed techniques to create a congruent image of an item or scene to a particular user, even if that congruency may not appear as congruent to another person.

Also, as noted above and described in more detail in this section, the techniques can use one or many of the characteristics of color to alter and improve rendering of color images.

EXAMPLES

Below are provided various examples.

Example one: A method for improving an accuracy or congruity of an image showing an item, the method comprising:
  capturing an image of an item along with a physical color standard;
  comparing the image of the physical color standard to a recorded image standard;
  altering the image of the item based on the comparison of the image of the physical color standard to the recorded image standard; and
  recording the altered image.

Example two: the method of example one, further comprising:
  presenting the altered image of the item along with the physical color standard with a user interface configured to receive a manual change to the image, the manual change based on a naked-eye comparison of the imaged physical color standard with a local, real-life physical color standard;
  receiving the manual change through the user interface; and
  further altering the altered image of the item based on the received manual change, and where recording the altered image records the altered image with the manual change.

Example three: one or more computer-readable media having instructions therein that, responsive to execution by one or more processors, perform operations of the method of examples one or two.

Example four: a mobile computing device having:
  a display; one or more computer processors; and
  one or more computer-readable media having instructions there that, responsive to execution by the one or more processors, perform the operations of the method of examples one or two and further renders the altered image on the display.

Example five: a mobile computing device having means for performing the operations of examples one, two, or three.

Example six: a method for improving an accuracy or congruity of an image showing an item, the method comprising:
  receiving an image of an item along with a physical color standard;
  comparing the image of the physical color standard to a locally-imaged copy of the physical color standard;
  altering the image of the item based on the comparison of the image of the physical color standard to the locally-imaged copy of the physical color standard; and
  providing the altered image for rendering.

Example seven: a method for improving an accuracy or congruity of an image showing an item, the method comprising:
  receiving an image of an item along with a physical color standard;
  presenting the image of the item along with the physical color standard with a user interface configured to receive a manual change to the image, the manual change based on a naked-eye comparison of the imaged physical color standard with a local, real-life physical color standard;
  receiving the manual change through the user interface; and
  providing the altered image for storage or rendering.

Example eight: one or more computer-readable media having instructions therein that, responsive to execution by one or more processors, perform the operations of the method of example six or seven.

Example nine: a mobile computing device having:
  a display;
  one or more computer processors; and
  one or more computer-readable media having instructions there that, responsive to execution by the one or more processors, perform the operations of the method of examples six or seven and further comprising rendering the altered image on the display.

Example ten: a mobile computing device having means for performing the operations of examples six, seven, or eight.

CONCLUSION

Although aspects of color rendering have been described in language specific to features and/or methods, the subject of the appended claims is not necessarily limited to the specific features or methods described. Rather, the specific features and methods are disclosed as example implementations of color rendering. Accordingly, other equivalent features and methods are intended to be within the scope of the appended claims. Further, various different aspects are described, and it is to be appreciated that each described aspect can be implemented independently or in connection with one or more other described aspects.

The invention claimed is:

1. A computing device having:
  a display;
  one or more computer processors; and
  one or more non-transitory computer-readable storage media having instructions stored thereon that, responsive to execution by the one or more computer processors, performs operations comprising:
    providing, on the display, a user interface through which to receive a user selection to alter a captured image of a physical color standard, the captured image of the physical color standard captured in a first ambient light, the user interface configured to receive a change to the captured image of the physical color standard based on a naked-eye comparison of the captured image of the physical color standard with a local, real-life physical color standard;

receiving, through the user interface, the user selection to alter the captured image of the physical color standard based on the naked-eye comparison of the captured image of the physical color standard with the local, real-life physical color standard, the local real-life physical color standard in a second ambient light, the second ambient light different from the first ambient light;

altering, based on the received user selection, an image of an item or scene captured in a same locale as that in which the captured image of the physical color standard was captured, the altered image of the item or scene enabled, through the user selection, to be more accurate or congruent with the second ambient light than the image of the item or scene; and presenting, on the display, the altered image of the item or scene.

2. The computing device of claim 1, wherein providing the user interface provides multiple selectable controls, each of the multiple selectable controls presented with a different representation of the physical color standard, and wherein receiving the user selection includes selection of one of the multiple selectable controls.

3. The computing device of claim 2, the operations further comprising determining the different representations of the physical color standard, the determining comprising:

determining, based on recorded color information for a known location of a first portion of the physical color standard, an actual color for a second portion of the captured image of the physical color standard; and determining, based on the actual color for the first portion, the different representations of the physical color standard.

4. The computing device of claim 3, wherein the determining the actual color correlates a location of the second portion of the captured image of the physical color standard with the known location of the first potion of the physical color standard.

5. The computing device of claim 1, wherein the user interface enables reception of the user selection through a user control that, through manual selection, changes a color of the captured image of the physical color standard, and wherein receiving the user selection to alter the captured image of the physical color standard includes alteration of a hue, colorfulness, saturation, lightness, or brightness of the captured image of the physical color standard.

6. The computing device of claim 1, wherein:
the captured image of the physical color standard and the image of the item or scene are within a same captured image; and
altering the captured image of the physical color standard and altering the image of the item or a scene are a same, contemporaneous operation.

7. The computing device of claim 1, the operations further comprising automatically altering another image of another item or scene, the other image of the other item or scene captured in the same locale, the automatic alteration based on: a difference between, or alteration of, the altered captured image of the physical color standard and the captured image of the physical color standard; or the user selection.

8. The computing device of claim 1, wherein presenting the altered image of the item or scene presents the altered image of the item or scene with an image of objects within a locale viewable by a user, the image of the objects including an image of the local, real-life version of the physical color standard.

9. The computing device of claim 8, wherein the instructions, responsive to execution by the one or more computer processors, further perform an operation comprising:
further altering the altered image of the item or scene based on a difference between the captured image of the physical color standard and the image of the local, real-life physical color standard.

10. The computing device of claim 9, wherein the further altering the altered image of the item or scene is performed automatically and without requiring a user selection.

11. The computing device of claim 1, wherein the instructions, responsive to execution by the one or more computer processors, further perform operations comprising:
saving a calibration for the display, the calibration based on the received user selection, the calibration usable to alter a future image for presentation on the display; and
receiving the future image and automatically altering, based on the calibration, the future image to provide an altered future image, the altered future image more accurate or more congruent than the future image prior to the alteration.

12. The computing device of claim 1, wherein the local, real-life physical color standard and the captured image of the physical color standard are both a same face, hand, arm, clothing, or hair of the user.

13. The computing device of claim 1, wherein the instructions, responsive to execution by the one or more computer processors, further perform operations comprising:
receiving a second image of a second item or scene;
receiving recorded color information or a first location on the first or a second captured image of a second physical color standard by which to attain the recorded color information and a second location of a portion of the second item or scene, the recorded color information indicating an accurate or congruent color of the portion of the second item or scene at the second location;
determining a difference in color between a color of the portion of the second item or scene in the image of the second item or scene and the recorded color information;
altering the second image of the item or scene based on the determined difference in color; and
recording or rendering the altered second image of the item or scene.

14. The computing device of claim 13, wherein the recorded color information or the first location indicate an accurate color of the portion of the second item or scene at the second location, and wherein the instructions, responsive to execution by the one or more processors, further perform an operation comprising:
receiving a second user selection to further alter the rendering of the altered second image of the item or scene, the further alteration based on the local, real-life physical color standard being in a locale viewable by the user or another user, the further alteration effective to improve a congruity of the altered second image of the item or scene to ambient lighting conditions of the locale viewable by the user or the other user.

15. The computing device of claim 1, wherein the instructions, responsive to execution by the one or more processors, further perform operations, prior to receiving the user selection, comprising:
- altering a prior image of the item or scene and a prior image of the physical color standard, the altering effective to provide the image of the item or scene or the image of the physical color standard, respectively, for presentation in the user interface, the altering the prior images including:
  - receiving the prior image of the physical color standard, the physical color standard having a known color in a known location within the physical color standard;
  - receiving the prior image of the item or scene captured in the same locale as that in which the prior image of the physical color standard was captured;
  - receiving or determining a correlation correlating a portion of the item or scene shown in the prior image of the item or scene to the known location on the physical color standard; and
- determining, based on the known color, an alteration effective to improve an accuracy of a color of the prior image of the physical color standard or the prior image of the item or scene.

16. The computing device of claim 1, wherein the item or scene is a makeup product.

17. The computing device of claim 16, wherein presenting the altered image of the item or scene presents, in an interface having an image of a user's hair, skin, clothing, or face, the makeup product, a portion of the makeup product, or a color of the makeup product.

18. The computing device of claim 17, wherein presenting the altered image of the item or scene presents the makeup product, the portion of the makeup product, or the color of the makeup product at a lighting angle matching the user's hair, skin, clothing, or face.

19. The computing device of claim 1, wherein the instructions, responsive to execution by the one or more computer processors, further perform an operation comprising presenting an altered captured image of the physical color standard on the display, through the user interface or another user interface, based on the received user selection, and prior to or contemporaneously with presenting the altered image of the item or scene.

20. The computing device of claim 1, wherein presenting the altered image of the item or scene presents the item within a user's locale, the user's locale having the second ambient light.

21. The computing device of claim 20, wherein presenting the altered image of the item or scene presents the item within an augmented reality interface and superimposed over at least a portion of the user's locale.

22. The computing device of claim 21, wherein presenting the altered image of the item or scene presents the item to match a lighting angle of the user's locale.

23. The computing device of claim 20, wherein the user's locale includes a hair, skin, face, or clothing of the user, and wherein the item is clothing, jewelry, or a clothing accessory.

24. The computing device of claim 1, wherein the computing device is a laptop, tablet, smartphone, or electronic-book reader.

* * * * *